US010020875B2

(12) United States Patent
Agarwal

(10) Patent No.: US 10,020,875 B2
(45) Date of Patent: Jul. 10, 2018

(54) DYNAMIC BANDWIDTH RESOURCE ALLOCATION FOR SATELLITE DOWNLINKS

(71) Applicant: ViaSat, Inc., Carlsbad, CA (US)

(72) Inventor: Anil Agarwal, North Potomoc, MD (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

(21) Appl. No.: 15/660,406

(22) Filed: Jul. 26, 2017

(65) Prior Publication Data
US 2018/0062733 A1 Mar. 1, 2018

Related U.S. Application Data

(60) Division of application No. 14/805,173, filed on Jul. 21, 2015, now Pat. No. 9,749,036, which is a
(Continued)

(51) Int. Cl.
H04W 72/04 (2009.01)
H04B 7/185 (2006.01)
H04B 7/22 (2006.01)
H04W 24/08 (2009.01)
H04L 5/00 (2006.01)
(Continued)

(52) U.S. Cl.
CPC ........... H04B 7/18515 (2013.01); H04B 7/22 (2013.01); H04L 5/0096 (2013.01); H04W 24/08 (2013.01); H04W 72/042 (2013.01); H04W 72/046 (2013.01); H04W 72/0446 (2013.01);
(Continued)

(58) Field of Classification Search
None
See application file for complete search history.

(56) References Cited

U.S. PATENT DOCUMENTS 5,216,427 A 6/1993 Yan et al.
5,519,404 A 5/1996 Cances et al.
(Continued)

FOREIGN PATENT DOCUMENTS

EP 1089459 A2 4/2001
WO WO-1999-049590 A1 9/1999
(Continued)

OTHER PUBLICATIONS

Non-final Office Action dated Feb. 2, 2012, U.S. Appl. No. 12/615,483, 20 pgs.
(Continued)

Primary Examiner — Vinncelas Louis
(74) Attorney, Agent, or Firm — Holland & Hart LLP

(57) ABSTRACT

Satellite communications systems, methods, and related devices are described. In one embodiment, a satellite communications system is configured to dynamically allocate bandwidth among different downlink beams. The satellite may receive and compile traffic measurements and terminal parameters. The satellite may be configured with different downlink beam coverage areas, and may dynamically allocate downlink bandwidth and particular frequency channels to different beam coverage areas based on the measurements and parameters. The satellite may also assign frequency channels and time slots based on such measurements and parameters.

24 Claims, 32 Drawing Sheets

Related U.S. Application Data continuation of application No. 14/106,301, filed on Dec. 13, 2013, now Pat. No. 9,118,455, which is a division of application No. 12/815,894, filed on Jun. 15, 2010, now Pat. No. 8,634,296.

(60) Provisional application No. 61/187,509, filed on Jun. 16, 2009.

(51) Int. Cl.
    *H04L 29/08* (2006.01)
    *H04B 7/212* (2006.01)
    *H04B 7/0408* (2017.01)

(52) U.S. Cl.
    CPC ........ *H04B 7/0408* (2013.01); *H04B 7/18539* (2013.01); *H04B 7/2123* (2013.01); *H04L 67/322* (2013.01)

(56) References Cited

U.S. PATENT DOCUMENTS

| | | | |
|---|---|---|---|
| 5,552,920 | A | 9/1996 | Glynn |
| 5,625,868 | A * | 4/1997 | Jan ................. H04B 7/18539 342/352 |
| 5,790,070 | A | 8/1998 | Natarajan et al. |
| 5,812,545 | A | 9/1998 | Liebowitz et al. |
| 5,914,944 | A | 6/1999 | Haugli et al. |
| 5,963,862 | A | 10/1999 | Adiwoso et al. |
| 6,037,983 | A | 3/2000 | Au et al. |
| 6,038,594 | A | 3/2000 | Puente et al. |
| 6,055,431 | A | 4/2000 | Dybdal |
| 6,067,453 | A | 5/2000 | Adiwoso et al. |
| 6,091,936 | A | 7/2000 | Chennakeshu et al. |
| 6,317,412 | B1 | 11/2001 | Natali et al. |
| 6,574,794 | B1 | 6/2003 | Sarraf et al. |
| 6,738,346 | B1 | 5/2004 | Prieto, Jr. et al. |
| 6,904,265 | B1 | 6/2005 | Valdivia et al. |
| 7,016,375 | B1 | 3/2006 | Rosenberg et al. |
| 7,027,414 | B2 | 4/2006 | Walsh et al. |
| 7,054,938 | B2 | 5/2006 | Sundqvist et al. |
| 7,130,283 | B2 | 10/2006 | Vogel et al. |
| 7,139,251 | B1 | 11/2006 | Varma |
| 7,366,134 | B2 | 4/2008 | Bose et al. |
| 7,382,743 | B1 | 6/2008 | Rao et al. |
| 7,729,244 | B2 | 6/2010 | Sadr |
| 7,751,320 | B2 | 7/2010 | Nuzman et al. |
| 7,756,957 | B2 | 7/2010 | Yaseen et al. |
| 7,936,707 | B2 | 5/2011 | Kota et al. |
| 7,945,269 | B2 | 5/2011 | Drakos |
| 8,085,802 | B1 | 12/2011 | Monk et al. |
| 8,311,006 | B2 | 11/2012 | Agarwal |
| 8,325,664 | B2 | 12/2012 | Agarwal |
| 8,351,383 | B2 | 1/2013 | Agarwal |
| 9,118,455 | B2 | 8/2015 | Agarwal |
| 2001/0022789 | A1 | 9/2001 | Huang et al. |
| 2001/0049284 | A1 | 12/2001 | Liu et al. |
| 2002/0027896 | A1 | 3/2002 | Hughes et al. |
| 2002/0054576 | A1 | 5/2002 | Gobbi |
| 2002/0159403 | A1 | 10/2002 | Reddy |
| 2002/0176398 | A1 | 11/2002 | Nidda |
| 2003/0031141 | A1 | 2/2003 | Schweinhart et al. |
| 2003/0032427 | A1 | 2/2003 | Walsh et al. |
| 2003/0035385 | A1 | 2/2003 | Walsh et al. |
| 2003/0069043 | A1 | 4/2003 | Chhaocharia et al. |
| 2003/0202537 | A1 | 10/2003 | Rogerson et al. |
| 2004/0100941 | A1 | 5/2004 | Lim |
| 2004/0132448 | A1 | 7/2004 | Torres et al. |
| 2004/0192376 | A1 | 9/2004 | Grybos |
| 2004/0219923 | A1 | 11/2004 | Oses et al. |
| 2005/0037764 | A1 | 2/2005 | Trachtman |
| 2005/0043933 | A1 | 2/2005 | Rappaport et al. |
| 2005/0053033 | A1 | 3/2005 | Kelly et al. |
| 2005/0227618 | A1 | 10/2005 | Karabinis et al. |
| 2006/0171390 | A1 | 8/2006 | La Joie |
| 2007/0060145 | A1 | 3/2007 | Song et al. |
| 2007/0153690 | A1 | 7/2007 | Stanwood et al. |
| 2007/0155316 | A1 | 7/2007 | Monte et al. |
| 2007/0195817 | A1 | 8/2007 | Denney et al. |
| 2007/0249402 | A1* | 10/2007 | Dong ................. H04B 7/0408 455/562.1 |
| 2008/0001812 | A1 | 1/2008 | Jalali |
| 2008/0062028 | A1 | 3/2008 | Chang |
| 2008/0080451 | A1 | 4/2008 | Rofougaran |
| 2008/0146145 | A1 | 6/2008 | Pateros et al. |
| 2008/0219266 | A1 | 9/2008 | Agarwal |
| 2008/0233865 | A1 | 9/2008 | Malarky et al. |
| 2008/0320540 | A1 | 12/2008 | Brooks et al. |
| 2009/0109895 | A1 | 4/2009 | Kota et al. |
| 2009/0191810 | A1 | 7/2009 | Sogabe et al. |
| 2010/0034107 | A1 | 2/2010 | Chin et al. |
| 2010/0118764 | A1 | 5/2010 | Agarwal |
| 2010/0118765 | A1 | 5/2010 | Agarwal |
| 2010/0118766 | A1 | 5/2010 | Agarwal |
| 2010/0118767 | A1 | 5/2010 | Agarwal |
| 2010/0118769 | A1 | 5/2010 | Agarwal |
| 2010/0120357 | A1 | 5/2010 | Agarwal |
| 2010/0120359 | A1 | 5/2010 | Agarwal |
| 2010/0120418 | A1 | 5/2010 | Agarwal |
| 2010/0183306 | A1 | 7/2010 | Pangrac et al. |
| 2010/0238869 | A1 | 9/2010 | Bruin et al. |
| 2010/0255776 | A1 | 10/2010 | Hudson et al. |
| 2010/0315949 | A1 | 12/2010 | Agarwal |
| 2011/0034166 | A1 | 2/2011 | Karabinis et al. |
| 2012/0300697 | A1 | 11/2012 | Agarwal |
| 2014/0177521 | A1 | 6/2014 | Agarwal |

FOREIGN PATENT DOCUMENTS

| | | |
|---|---|---|
| WO | WO-2004-073229 A2 | 8/2004 |
| WO | WO-2008-100341 A2 | 8/2008 |
| WO | WO-2008-109860 A2 | 9/2008 |

OTHER PUBLICATIONS

Notice of Allowance dated May 25, 2012, U.S. Appl. No. 12/615,483, 10 pgs.
Non-final Office Action dated Oct. 12, 2012, U.S. Appl. No. 13/569,641, 19 pgs.
Notice of Allowance dated Feb. 13, 2013, U.S. Appl. No. 13/569,641, 11 pgs.
International Preliminary Report on Patentability, Int'l App. No. PCT/US2009/063919, dated May 19, 2011, 6 pgs.
International Search Report and Written Opinion, Int'l App. No. PCT/US2009/063919, dated Jun. 22, 2010, 8 pgs.
Non-final Office Action dated Mar. 14, 2012, U.S. Appl. No. 12/615,709, 21 pgs.
Notice of Allowance dated Oct. 26, 2012, U.S. Appl. No. 12/615,709, 15 pgs.
Non-final Office Action dated Mar. 13, 2012, U.S. App. No. 12/615,720, 22 pgs.
Notice of Allowance dated Oct. 12, 2012, U.S. Appl. No. 12/615,720, 15 pgs.
Non-final Office Action dated Mar. 1, 2012, U.S. Appl. No. 12/615,735, 20 pgs.
Notice of Allowance dated Jul. 9, 2012, U.S. Appl. No. 12/615,735, 14 pgs.
International Preliminary Report on Patentability, Int'l App. No. PCT/US2009/063917, dated May 19, 2011, 8 pgs.
International Search Report and Written Opinion, Int'l App. No. PCT/US2009/063917, dated Jun. 24, 2010, 9 pgs.
Non-final Office Action dated Feb. 28, 2012, U.S. Appl. No. 12/615,488, 19 pgs.
Non-final Office Action dated Aug. 2, 2012, U.S. Appl. No. 12/615,488, 21 pgs.
Notice of Allowance dated Jan. 3, 2013, U.S. Appl. No. 12/615,488, 10 pgs.
Non-final Office Action dated Feb. 27, 2012, U.S. Appl. No. 12/615,491, 30 pgs.

(56) References Cited

OTHER PUBLICATIONS

Notice of Allowance dated Sep. 28, 2012, U.S. Appl. No. 12/615,491, 15 pgs.
Supplemental Notice of Allowance dated Dec. 3, 2012, U.S. Appl. No. 12/615,491, 9 pgs.
Notice of Allowance dated Jan. 27, 2012, U.S. Appl. No. 12/615,499, 15 pgs.
Notice of Allowance dated Oct. 15, 2012, U.S. Appl. No. 12/615,499, 12 pgs.
Non-final Office Action dated Aug. 22, 2012, U.S. Appl. No. 12/615,512, 24 pgs.
Notice of Allowance dated Dec. 28, 2012, U.S. Appl. No. 12/615,512, 9 pgs.
International Preliminary Report on Patentability, Int'l App. No. PCT/US2009/063914, dated May 19, 2011, 11 pgs.
International Search Report and Written Opinion, Int'l App. No. PCT/US2009/063914, dated Jun. 28, 2010, 12 pgs.
Restriction Requirement dated Nov. 6, 2012, U.S. Appl. No. 12/815,894, 9 pgs.
Non-final Office Action dated Feb. 15, 2013, U.S. Appl. No. 12/815,894, 57 pgs.
Notice of Allowance dated Sep. 13, 2013, U.S. Appl. No. 12/815,894, 21 pgs.
International Preliminary Report on Patentability, Int'l App. No. PCT/US2010/038721, dated Dec. 29, 2011, 8 pgs.
International Search Report and Written Opinion, Int'l App. No. PCT/US2010/038721, dated Oct. 19, 2010, 9 pgs.
Sbarounis et al., "Dynamic Bandwidth and Resource Allocation (DBRA) for MILSATCOM", 2004, IEEE Military Communications Conference, 7pgs.

\* cited by examiner

| Terminal Id | Class | Min SR | CIR |
|---|---|---|---|
| 1 | 0 | 32 | 100 |
|   | 1 | 64 | 0 |
|   | 2 | 0 | 100 |
|   | 3 | 0 | 200 |

FIG. 10

| | Terminal 1 | Terminal 2 | Terminal 3 | Terminal 4 | ... | Terminal N |
|---|---|---|---|---|---|---|
| MCG | MCG 1 | MCG 2 | MCG 1 | MCG 3 | ... | MCG 1 |
| Class 1 | MinSR, CIR | MinSR, CIR | MinSR, CIR | MinSR, CIR | ... | MinSR, CIR |
| ... | ... | ... | ... | ... | ... | ... |
| Class T | MinSR, CIR | MinSR, CIR | MinSR, CIR | MinSR, CIR | ... | MinSR, CIR |

FIG. 11

| Beam N | MCG 1 | MCG 2 | ... | MCG N |
| Beam 2 | MCG 1 | MCG 2 | ... | MCG N |
| Beam 1 | MCG 1 | MCG 2 | ... | MCG N |
| Mode | 12/4QAM (7/8) | 12/4QAM (2/3) | ... | BPSK |
| Queue 1 | MIR | MIR | ... | MIR |
| ... | ... | ... | ... | ... |
| Queue Q | MIR | MIR | ... | MIR |

FIG. 12

| Beam 1  | MCG 1           | MCG 2           | ...             | MCG N           |
|---------|-----------------|-----------------|-----------------|-----------------|
| Class 1 | MinSR, CIR, MIR | MinSR, CIR, MIR | ...             | MinSR, CIR, MIR |
| ...     | ...             | ...             | ...             | ...             |
| Class N | MinSR, CIR, MIR | MinSR, CIR, MIR | MinSR, CIR, MIR | MinSR, CIR, MIR |

FIG. 13

DYNAMIC BANDWIDTH RESOURCE ALLOCATION FOR SATELLITE DOWNLINKS

CROSS REFERENCES

The present application is a divisional of U.S. patent application Ser. No. 14/805,173, filed Jul. 21, 2015, entitled "DYNAMIC BANDWIDTH RESOURCE ALLOCATION FOR SATELLITE DOWNLINKS, which is a continuation of U.S. patent application Ser. No. 14/106,301, filed Dec. 13, 2013, entitled "DYNAMIC BANDWIDTH RESOURCE ALLOCATION FOR SATELLITE DOWNLINKS", which claims priority from co-pending U.S. patent application Ser. No. 12/815,894, filed Jun. 15, 2010, entitled "DYNAMIC BANDWIDTH RESOURCE ALLOCATION FOR SATELLITE DOWNLINKS"; which claims priority from U.S. Provisional Patent App. No. 61/187,509, filed Jun. 16, 2009, entitled "DYNAMIC BANDWIDTH RESOURCE ALLOCATION FOR SATELLITE DOWNLINKS"; all of which are hereby incorporated by reference in their entirety.

This application is related to the following U.S. patent applications:

U.S. patent application Ser. No. 12/615,488, filed Nov. 10, 2009, entitled "BANDWIDTH ALLOCATION ACROSS BEAMS IN A MULTI-BEAM SYSTEM";
U.S. patent application Ser. No. 12/615,491, filed Nov. 10, 2009, entitled "CARRIER GROUP APPORTIONMENT FOR A SATELLITE COMMUNICATIONS SYSTEM";
U.S. patent application Ser. No. 12/615,499, filed Nov. 10, 2009, entitled "APPORTIONED CARRIER GROUP SLOT PLACEMENT FOR A SATELLITE COMMUNICATIONS SYSTEM";
U.S. patent application Ser. No. 12/615,512, filed Nov. 10, 2009, entitled "TERMINAL MODE ASSIGNMENT FOR A SATELLITE COMMUNICATIONS SYSTEM";
U.S. patent application Ser. No. 12/615,709, filed Nov. 10, 2009, entitled "TRAFFIC CLASS POOL SIZING FOR A SATELLITE COMMUNICATIONS SYSTEM";
U.S. patent application Ser. No. 12/615,720, filed Nov. 10, 2009, entitled "TERMINAL SLOT ASSIGNMENT FOR A SATELLITE COMMUNICATIONS SYSTEM";
U.S. patent application Ser. No. 12/615,735, filed Nov. 10, 2009, entitled "RESOURCE FAIRNESS POLICIES FOR ALLOCATION OF RESOURCES IN A SATELLITE COMMUNICATIONS SYSTEM";
U.S. patent application Ser. No. 12/615,483, filed Nov. 10, 2009, entitled "DYNAMIC FREQUENCY ASSIGNMENT IN A MULTI-BEAM SYSTEM"; and
U.S. patent application Ser. No. 13/569,641, filed Aug. 8, 2012, entitled "DYNAMIC FREQUENCY ASSIGNMENT IN A MULTI-BEAM SYSTEM".

This application hereby incorporates by reference herein the content of the aforementioned applications in their entirety and for all purposes.

STATEMENT AS TO RIGHTS TO INVENTIONS MADE UNDER FEDERALLY SPONSORED RESEARCH OR DEVELOPMENT

This Government may have rights in aspects of this invention pursuant to Prime Contract No. FA8808-04-C-0023.

BACKGROUND

The present invention relates to satellite communications in general and, in particular, to resource allocation. Satellite communications systems often have a limited amount of available bandwidth to be allocated to terminals. However, the bandwidth needs for the terminals within a system may change over time. Moreover, different terminals may have varying service level agreements, and receive different types and amounts of traffic.

It may, therefore, be desirable to utilize a system design in which resources are allocated dynamically, in response to bandwidth measurements and terminal characteristics, along with various quality of service metrics.

SUMMARY

Novel satellite communications systems, methods, and related devices are described. In a one set of embodiments, a novel architecture for a multi-beam satellite communications system is described for allocating resources among different downlink beams and modulation and coding ("modcode") groups. Such a system may be made up of a satellite in communication with terminals (e.g., subscriber terminals or gateways). The satellite may receive, monitor, and compile various types of traffic data and terminal parameters. The satellite may be configured with different downlink beam coverage areas, and may dynamically allocate downlink particular frequency channels and time slots among different beams.

In a one set of embodiments, downlink bandwidth requirements are estimated based on traffic measurements and terminal parameters (e.g., minimum sustained rate (MinSR) and committed information rate (CIR)). Bandwidth may be estimated on a per-beam, or per modulation and coding group (MCG), basis. The bandwidth estimate may be used to allocate bandwidth on a per-beam, or per MCG, basis. Various fairness policies may be used in the bandwidth allocation process. In another set of embodiments, modulators may be assigned to specific MCGs or beams. As traffic changes, a process of modulator balancing and reassignment is described. In still another set of embodiments, frequency channels and time slots therein may be assigned to MCGs.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to anyone of the similar components having the same first reference label irrespective of the second reference label.

FIG. 10 is a diagram of a table of terminal parameter information that may be sent from a terminal to a satellite according to various embodiments of the invention.

FIG. 11 is a diagram illustrating a table of parameter information according to various embodiments of the invention.

FIG. 12 is a diagram illustrating tables of traffic measurement information according to various embodiments of the invention.

FIG. 13 is a diagram illustrating tables of resource estimation information according to various embodiments of the invention.

DETAILED DESCRIPTION OF THE INVENTION

Novel satellite communications systems, methods, and related devices are described. In one embodiment, a satellite communications system is configured to dynamically allocate downlink resources among different downlink beams. Such a system may include a satellite in communication with terminals (e.g., subscriber terminals or gateways). The satellite may receive, monitor, and compile traffic data from the terminals. The satellite may be configured with different downlink beam coverage areas, and may dynamically allocate downlink resources including particular frequency channels to different beam coverage areas based on the traffic data and service level requirements. The satellite may provide full mesh connectivity between terminals in the same beam or across beams. A network control center (Nee), alone or in combination with functionality on the satellite, may also be configured to perform the resource allocation functionality described herein.

The following description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, devices, and software may individually or collectively be components of a larger system, wherein other procedures may take precedence over or otherwise modify their application. Also, a number of steps may be required before, after, or concurrently with the following embodiments.

Figure 1:
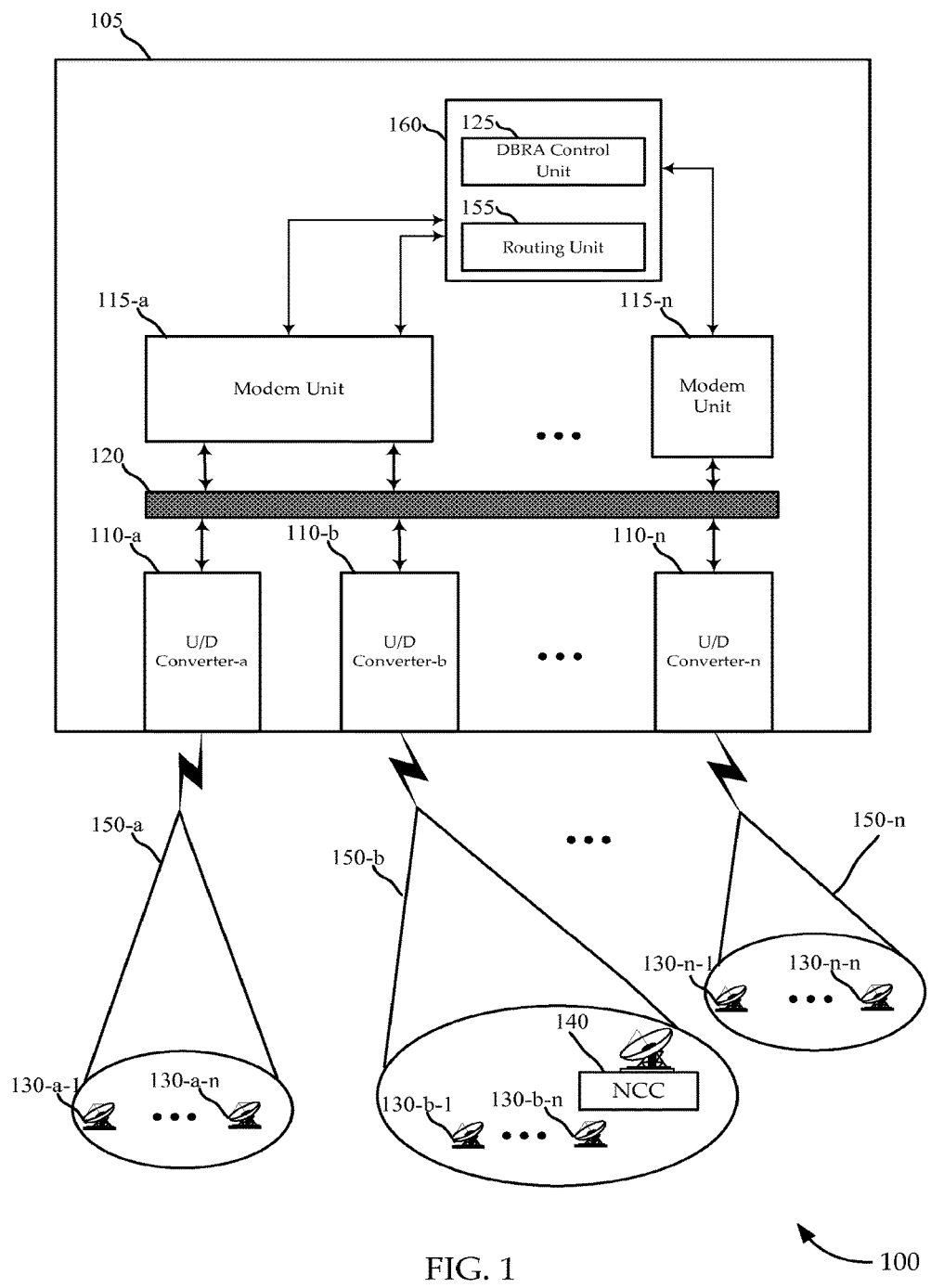
FIG. 1 is a block diagram of a multi-beam satellite communications system including components configured according to various embodiments of the invention.

I. System Architecture:

Systems, devices, methods, and software are described for a satellite communications system, wherein the system is configured to include novel bandwidth allocation functionality. FIG. 1 is a high-level block diagram illustrating a satellite communications system 100 according to various embodiments of the invention. The system includes a satellite 105 in communication with terminals 130 (e.g., subscriber terminals or gateways), a network control center (Nee) 140, and possibly one or more other satellites (not shown). The satellite 105 in the illustrated embodiment includes three or more beams ISO-a, ISO-b ... 150-n, each beam 150 including a coverage area (note that in other embodiments, there may be a single beam satellite). Respective U/D converters 110 may receive signals transmitted via the terminals 130, and transmit signals to terminals 130, in their beam coverage area, as shown in FIG. 1. The U/D converters 110 for each beam may be configurable to receive different frequency ranges, and may be dynamically configured to serve different beams (e.g., all or part of one or more beams). U/D converters 110 are in communication with modem units 115 via a switch 120 that allows the modem units 115 to be connected with different U/D converters 110. The modem units 115 may provide a range of modulator and demodulator functionality described in more detail below. The modem units 115 are in communication with a control unit 160 (including a Dynamic Bandwidth Resource Allocation (DBRA) control unit 125 and routing unit 155), which may manage and allocate system and satellite 105 resources.

Each beam 150 supports the terminals 130 within its coverage area (e.g., providing uplink or downlink resources). Each beam 150 may be allocated one, or more, ranges of frequencies. In one embodiment, there is a single frequency range allocated to each beam 150 (although the frequency range may be allocated to other beams 150, as well). The coverage of different beams 150 may be non-overlapping or have varying measures of overlap. A portion of spectrum may also be allocated for use to communicate with another satellite (not shown) via an inter-satellite link (ISL). The satellite 105 may provide connectivity between terminals 130 in the same beam and across beams (via star or mesh connections), as well as to and from beams of other satellites via ISLs. Thus, for terminals 130 served by the same satellite 105, there may be full-mesh, single-hop connectivity between terminals, or they may communicate via the NCC 140. For terminals 130 served by different satellites, there may be full-mesh, two-satellite-hop connectivity between terminals, or various star configurations may be employed.

In one embodiment, the DBRA control unit 125 onboard satellite 105 manages bandwidth resources (e.g., ranges of frequencies, and time slots therein) and assigns them to coverage beams 150, modulation and coding groups (within each beam). These allocations may be for a downlink or uplink, although much discussion herein is attributable to the downlink. To accomplish these allocations, the DBRA control unit 125 dynamically manages both spectrum resources and satellite 105 resources (e.g., routing and switching functionality, U/D converter frequencies, demodulators, modulators, buffers, etc.). DBRA resource management decisions may be driven by terminal 130 parameters, traffic measurements, and the underlying configuration. For example, the DBRA control unit 125 may measure past traffic flows from terminals 130 within different beams (e.g., looking at queue sizes and dropped packets for some classes, as well). The DBRA control unit 125 may analyze various terminal 130 resource allocations (e.g., terminal parameters such as MinSR and CIR), and assign frequencies and slots dynamically based on various aspects of service level agreements (SLAs). In other embodiments, one or more of the DBRA control unit 125 functions described herein may be performed by the NCC 140 (which may be made up of a number of internet worked devices, or be integrated into a gateway terminal). Various types of bandwidth-related resources are described generally herein as "resource units." For example, a resource unit may include an assignable or allocatable time slot, frequency subband, or any other type of system or satellite resource. Further, the resource units may not correspond to other units of measurement (e.g., each time slot resource unit does not necessarily represent a single time slot), and should therefore be broadly construed, for example as any type of quantization that is useful for allocation.

Terminals 130 may be mobile or fixed, and thus may log on to different beams 150 depending on location and may move from beam to beam. Terminals 130 (which may include the NCC 140) may have allocations of particular amounts of downlink bandwidth for different traffic types, and may consume varying amounts of downlink resources for different types of traffic, using varying link condition dependent downlink modes. The DBRA control unit 125 may be configured to allocate the appropriate amount of resources to each beam. It may utilize sharing rules (policies) to allocate resources among terminals 130 when demand exceeds resource availability, providing preferences to terminal traffic that conform to the SLAs. In some embodiments, terminal 130 SLAs provide information about how much traffic of a given traffic class is guaranteed to a terminal 130 (CIR).

In one embodiment, the satellite 105 includes a number of modem units 115. Each modem unit 115 may have a single modulator that is shared among a number of downlink beams, with each beam served by only one modulator. In one embodiment, a modulator is characterized as a module that outputs a waveform for one carrier at a given time period. The modem units 115 may be managed by the DBRA control unit 125. Each modem unit 115 may receive a signal (e.g., an IF signal) from, or output a signal to, an associated U/D converter 110. Each modem unit 115 may provide some or all of the physical, link, and MAC layer functions for signals received from terminals 130. Other modem configurations may be used as well, as evident to those skilled in the art. A variety of functions may be performed by the modems units 115, such as a) modulation, demodulation, coding, decoding, framing, time-division multiple access (TDMA); b) dynamic/adaptive/variable modulation/coding; c) frequency and/or power management; d) master, or secondary, reference terminal functions, including acquisition and synchronization support and link quality measurements (e.g., measuring frequency, timing, or power of one or more received signals); e) packet segmentation and reassembly; f) dynamic TDMA bandwidth request; g) packet queuing, scheduling, and queue management; and h) internet protocol (IP) packet routing and forwarding. Note that there may be different numbers of modulators and demodulators on a satellite 105, or in a particular modem unit 115. In other embodiments, one or more of these functions may be performed by the NCC 140.

The routing unit 155, in communication with each of the modem units 115, may provide the layer 3 functionality or other routing functionality (instead of the modem units 115), including IP packet routing across multiple beams/transponders. The routing unit 155 (or the modem units 115) may perform a variety of routing functions including: a) IP routing for various protocols (RIP, BGP, OSPF, PIM) and multicast replication; b) traffic conditioning, policing, and access control; and c) RSVP/ARSVP.

The NCC 140 may also provide network management services for the modem units 115 and the terminals 130. The NCC 140 may include the following functions: a) IP modem management (provisioning, configuration, software/firmware downloads to terminals, status and performance management); b) system broadcast messages; c) terminal acquisition and synchronization support; d) adaptive terminal frequency, timing, and power management support and correction; e) dynamic bandwidth/resource allocation; and f) interface with network management and router management.

Therefore, downlink bandwidth or other resources may be dynamically assigned to beams 150, and modulation and coding groups (MCGs) therein, by the DBRA control unit 125 onboard satellite 105, the NCC 140, or any combination thereof. Terminals 130, or the DBRA control unit 125 onboard satellite 105, may measure traffic flows and identify downlink service level requirements. In the alternative, bandwidth needs may be estimated. Specific time slots in specific downlink carriers may be dynamically allocated based on requests and/or estimates. For uplink bandwidth, a similar process may occur, except that bandwidth estimation and requests may be done by any combination of the satellite modem units 115, the NCC 140, or the DBRA control unit 125. The NCC 140 and/or the DBRA control unit 125 may include algorithms and software to efficiently perform dynamic bandwidth allocation for all terminals, while meeting CIR and fairness objectives.

System 100 parameters may be configurable using the NCC 140 and can be optimized even after the system is operational. Examples of such parameters include carrier sizing, spacing and number of carriers, number of bursts for control and management traffic, guard times between bursts, and rules for bandwidth allocation. In one embodiment, an off-path link is made available for managing modem units 115 and the DBRA control unit 125 (e.g., in case the on-path link becomes unavailable due to a software and/or hardware failure). This off-path link may be a slow access link. Thus, the NCC 140 may be configured to control, manage, and monitor the links of the system 100. The NCC 140 may monitor and control links in beams other than its own. The NCC 140, therefore, may perform near real-time capacity and dynamic bandwidth management in addition to configuration, accounting, performance, and security/authentication functions. The NCC 140 may host a web server to provide access to browser clients.

As noted above, although the communications system 100 is illustrated as a geostationary satellite-based communications system, it should be noted that various embodiments described herein are not limited to use in geostationary satellite-based systems; for example, some embodiments could be low earth orbit (LEO) satellite-based systems. The terminals 130 may include, for example, gateways or subscriber terminals (sometimes called user terminals). The system 100 may be a star, mesh, or hybrid, and may be implemented in an existing star, mesh, or hybrid system.

One or more computing devices may be connected locally (e.g., a LAN, with wired or wireless connectivity) with a terminal 130, and a connected terminal may be connected to a wider network, as well. Data and information, such as IP datagrams, may be sent from such a connected device through a terminal 130 and the satellite 105, and to another terminal 130 (or other satellite 105). A variety of physical layer transmission modulation and coding techniques may be used on links between the satellite 105 and terminal 130 (or other satellite 105), including those defined with the DVB-S2 and WiMAX standards. Different multiplexing schemes may be used as well, including Multi-Frequency Time-Division Multiple Access (MF-TDMA), TDMA, Frequency Division Multiple Access (FDMA), Orthogonal Frequency Division Multiple Access (OFDMA), Code Division Multiple Access (CDMA), or any number of hybrid or other schemes known in the art. In various embodiments, the physical layer techniques may be the same, or different, for downstream and upstream links between the satellite 105 and terminal 130 (or other satellite). In one embodiment, the system 100 will support binary phase shift keying (BPSK) and quadrature phase shift keying (QPSK) modulations and Viterbi and Reed-Solomon forward error correction (FEC). The system may additionally support 8-PSK and 16 QAM, and LDPC and Turbo code FEC.

In one embodiment, the downlink is in a multi-frequency time-division multiple access (MF-TDMA) format. The downlink spectrum is configured as N carriers, which may include different or configurable different symbol rates and carrier sizes. Each carrier is divided in time into fixed period frames, and each frame contains a number of variable sized time slots, or bursts. In general, each time slot may be dynamically assigned to and used by a terminal 130 for sending data. Each time slot may use a specific modulation and FEC coding rate, and contain one or more packet segments. User IP packets may be fragmented into packet segments and reassembled at the modem unit 115 before IP processing. Certain bursts are used for network control packets for terminal acquisition, terminal synchronization maintenance, and bandwidth requests. In one embodiment, the burst structures used may be the same as those used in existing mesh architectures.

A terminal 130 may use an antenna to transmit a signal to the satellite 105. In one embodiment, the antenna is a parabolic reflector with high directivity in the direction of the satellite 105 and low directivity in other directions. The antenna may have a variety of alternative configurations and include operating features such as high isolation between orthogonal polarizations, high efficiency in the operational frequency bands, and low noise. Terminals 130 with small antenna HPA sizes and limited power may be accommodated by configuring a few small sized carriers (e.g., 384 or 512 ksps) on the uplink.

Terminals 130 may include existing, modified, and specifically configured terminals. Terminals 130 may include a small indoor unit (IDD) and an appropriately sized antenna and RF equipment (the outdoor unit ODD). The IDU may have a 10/100/1000baseT Ethernet/IP interface as the user traffic interface. The IDU may provide IP router functionality to the user network. In one embodiment, terminals 130 are managed through the satellite 105 by the NCC 140. The NCC 140 may, therefore, be configured to allocate uplink bandwidth on carriers for these terminals 130, and send routing information to the terminals 130.

The satellite 105 may, for example, use a reflector antenna, lens antenna, array antenna, active antenna, or other mechanism known in the art for reception of such signals. The satellite 105 may process the signals received from a terminal 130, and then route and transmit the processed signal down to another terminal 130 (which may be within the same, or different, beam, or may be served via another satellite 105 via an ISL). In one embodiment, the satellite 105 operates in a multi-beam mode, transmitting a number of narrow beams each directed at a different region of the earth, allowing for frequency re-use.

With the foregoing description of certain options for the system, one particular embodiment will now be described with more detail. In this embodiment, assume that there are five bands (channels) to be allocated among a set of 20 downlink: beams. In one embodiment, two channels will be 80 MHz, and three channels will be 40 MHz. One channel (or, in some embodiments, more channels) will be allocated to each downlink: beam, and a 3-color reuse constraint will be employed. The bandwidth allocation among beams may occur every n epochs (e.g., every 16 epochs). Each epoch may be 640 ms, and there may be 320 time slots in each epoch. Each sub-channel may support BPSK, QPSK, 8-PSK, and 16 QAM. Time slots in the appropriate sub-channel size and at a particular modulation may be assigned to terminals. It is worth noting that the above are merely examples. For example, there may instead be two 80 MHz bands, and one 40 MHz band. Alternatively, there may be four 120 MHz channels and eight 60 MHz channels. A number of other channel sizes, epoch lengths, and time slot lengths may be used in other embodiments.

More generally, the satellite communications system 100 allocates downlink: resources in a multi-beam satellite communications network. The DBRA control unit 125 onboard satellite 105, the NCC 140, or any combination thereof, may control this functionality. The system 100 may identify an estimated downlink: resource unit demand for each of the beams for a future defined time duration based downlink: traffic data for the beams. The system 100 may also identify an amount of allocatable resource units for the future defined time duration. The system 100 may dynamically allocate portions of the amount of allocatable resource units to each of the beams to generate a changed per-beam downlink: resource unit allocation for the future defined time duration, the allocation based on the estimated downlink: resource unit demand for each of the beams.

Data packets destined for a downlink: may be grouped as modulation and coding groups (MCGs), with each group including packets that are 1) destined to the same beam (e.g., beam 150 of FIGS. 1), and 2) have the same modulation and coding format designation. Therefore, the term MCG may be used hereinafter to define a group that includes packets destined to the same beam and assigned the same modulation and coding format. In some embodiments, resources may be allocated to modulation and coding format, and then allocated to beams. Those skilled in the art will recognize the various options. The terms "MCG" and "modulation and coding group" may be used interchangeably hereinafter.

Figure 2:
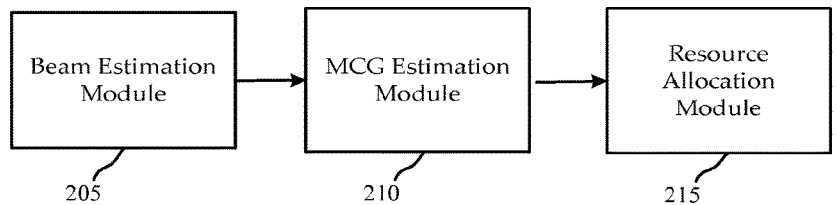
FIG. 2 is a block diagram of a configuration that may be used in a device or system to dynamically allocate downlink resources among beams according to various embodiments of the invention.

Turning to FIG. 2, a block diagram is shown illustrating an example configuration 200 for dynamically allocating downlink: resources to beams in a satellite communications network. This configuration 200 may be implemented in the system 100 of FIG. 1 or, more specifically, in the NCC 140, the DBRA control unit 125, or any combination thereof. However, some or all of the functionality of these modules may be implemented in other devices or sets of devices.

The configuration 200 includes a beam estimation module 205, an MCG estimation module 210, and a resource allocation module 215, which may each be in communication with each other. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The beam estimation module 205 identifies an estimated downlink resource unit demand for each of a number of beams in a multi-beam system. This estimate may be for a defined future time duration, and be based in part on downlink traffic data for each beam, monitored before the defined time duration. The beam estimation module 205 may estimate downlink resource unit demand for each beam by measuring, on the satellite (e.g., satellite 105 of FIG. 1), the amount of traffic directed to each beam. The beam estimation module 205 may identify an estimated downlink resource unit demand for each beam by receiving traffic measurements made by the terminals in each beam measuring amount of traffic received from the satellite and destined for each beam. Alternatively, the beam estimation module 205 may identify an estimated downlink resource unit demand for each of the beams by receiving (e.g., at an NCC 140) a measurement taken on the satellite identifying an amount or other rate of traffic directed to each beam. The beam estimation module 205 may identify or modify the estimated downlink resource unit demand for each beam by measuring average queue sizes at the satellite attributable to each beam, or by calculating a number or rate of dropped packets destined for each downlink beam (e.g., occurring at the satellite or at a gateway transmitting to the satellite).

The MCG estimation module 210 may identify an estimated downlink resource unit demand for each of a number of modulation and coding groups. This estimate may be specific to beams (e.g., beams 150 of FIG. 1), or may a system-wide estimate. The MCG estimation module 210 may receive link condition data from the terminals within the beam, and estimate the downlink resource unit demand for each modulation and coding group based on the link conditions.

The resource allocation module 215 identifies an amount of allocatable resource units for the downlink for a defined time duration. The resource allocation module 215 may dynamically allocate a portion of the allocatable resource units to each beam to generate a per-beam downlink resource unit allocation for the defined time duration. This dynamic allocation may be proportional or otherwise based on the estimated downlink resource unit demand for each beam. The resource allocation module 215 may also dynamically allocate the allocated resource units for each beam among the modulation and coding groups for the defined time duration. This modulation and coding group allocation may be proportional or otherwise based on the estimated downlink resource unit demand for each of the modulation and coding groups in each respective beam.

Figure 3:
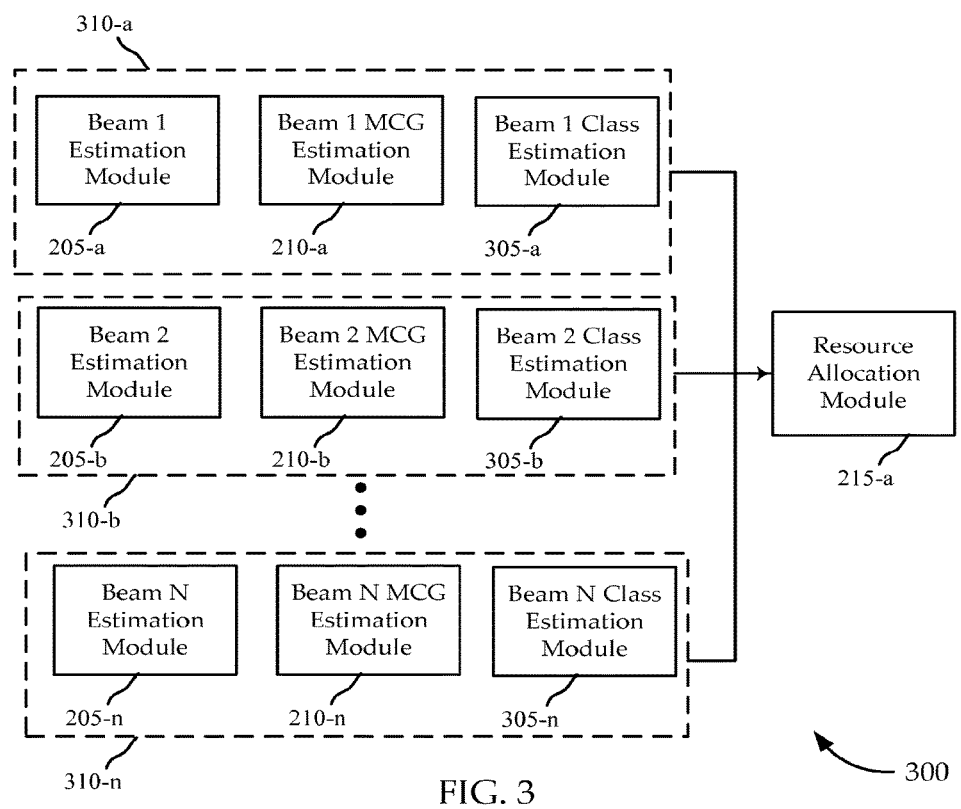
FIG. 3 is block diagram of a system that may be used in a device or system to dynamically allocate downlink resources among beams and modulation and coding groups according to various embodiments of the invention.

Turning to FIG. 3, a block diagram is shown illustrating another example system 300 for dynamically allocating downlink resources to beams in a satellite communications network. This system 300 may be implemented in the system 100 of FIG. 1 or, more specifically, in the NCC 140, the DBRA control unit 125, or any combination thereof. This system 300 may be an example of the configuration described with reference to FIG. 2.

The system 300 includes a series of beam-specific estimation modules 310. Each beam-specific estimation modules 310 includes a beam estimation module 205, an MCG estimation module 210, and a class estimation module 305 for the respective beam. Within each beam-specific estimation module 310, a beam estimation module 205 identifies an estimated downlink resource unit demand for the relevant beam. Within each beam-specific estimation module 310, the MCG estimation module 210 may identify an estimated downlink resource unit demand for each of a number of modulation and coding groups for the relevant beam. Within each beam-specific estimation module 310, the class estimation module 305 may identify an estimated downlink resource unit demand for each of a number of traffic classes (e.g., voice, interactive video, data, etc.) for the relevant beam. In this, or other embodiments, the class estimation may be a system-wide estimate, be specific to beams (e.g., beams 150 of FIG. 1), be specific to a modulation and coding format system-wide, or be specific to MCGs (within a beam).

The resource allocation module 215-a may receive the estimates from each beam specific estimation module 310. The resource allocation module 215-a identifies an amount of allocatable resource units for the downlink for a defined time duration. The resource allocation module 215-a may dynamically allocate a portion of the allocatable resource units to each beam to generate a per-beam downlink resource unit allocation for the defined time duration. The resource allocation module 215-a may also dynamically allocate the allocated resource units for each beam among the modulation and coding groups for the defined time duration. The resource allocation module 215-a may also dynamically allocate the allocated resource units for each modulation and coding group within each beam among classes for the defined time duration. There are a number of alternative ordering schemes that may be used to perform the allocations (among beams, MCGs, and classes) in parallel or serially. Thus, the relative allocation among traffic classes may be different in each modulation and coding group, and be different across beams. In another embodiment, the relative allocation among traffic classes may be substantially the same in each modulation and coding group, and be substantially the same across beams.

Figure 4:
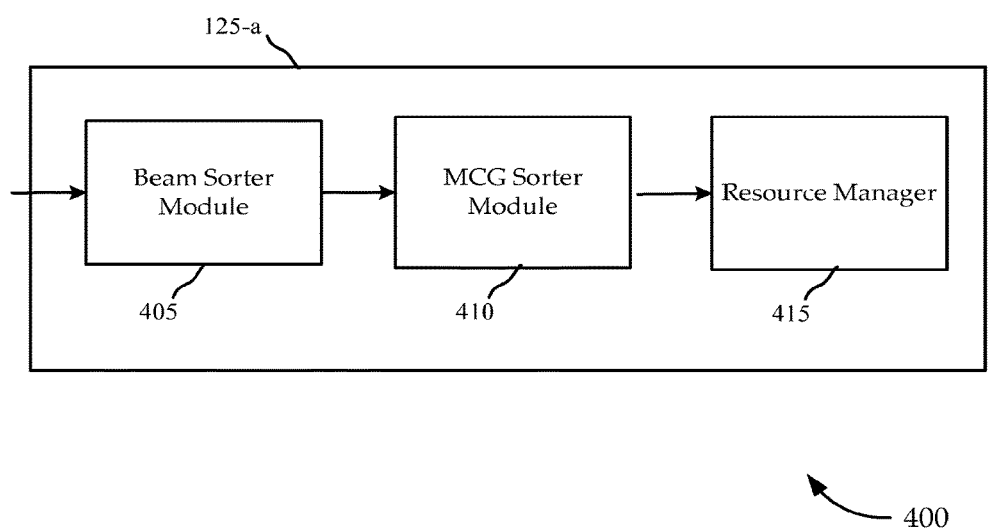
FIG. 4 is a block diagram illustrating a DBRA control unit for dynamically allocating downlink resources among beams according to various embodiments of the invention.

Turning to FIG. 4, a block diagram 400 is shown illustrating an example of a DBRA control unit 125-a for dynamically allocating downlink resources to beams in a satellite communications network. This DBRA control unit 125-a may be implemented in the system 100 of FIG. 1 or, more specifically, in the satellite 105. However, aspects may be implemented off the satellite, as well (e.g., in the NCC 140).

The DBRA control unit 125-a includes a beam sorter module 405, an MCG sorter module 410, and a resource manager 415, which may each be in communication with each other. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. The configuration 200 of FIG. 2 may be implemented in the resource manager 415.

As packets pass through a satellite (e.g., satellite 105 of FIG. 1) from an uplink to a downlink, they may pass through a router unit 155 before being encoded, modulated, and up converted for transmission via the downlink. The beam sorter module 405 may group these packets by downlink beam (e.g., beam 150 of FIG. 1). The MCG sorter module 410 may, within each beam, group packets according to their modulation and coding formats, thereby sorting the packets according to MCGs.

The resource manager 415 may identify an amount of allocatable resource units for the downlink for a defined time duration. The resource manager 415 may dynamically allocate a portion of the allocatable resource units to each beam to generate a per-beam downlink resource unit allocation for the defined time duration. This dynamic allocation may be proportional or otherwise based on the estimated downlink resource unit demand for each beam (e.g., based on monitored traffic through the DBRA control unit 125-a). The resource manager 415 may also dynamically allocate the resource units allocated for each beam among the modulation and coding groups for the defined time duration. This modulation and coding group allocation may be proportional or otherwise based on the estimated downlink resource unit demand for each of the modulation and coding groups in each respective beam (e.g., based on monitored traffic through the DBRA control unit 125-a).

Figure 5:
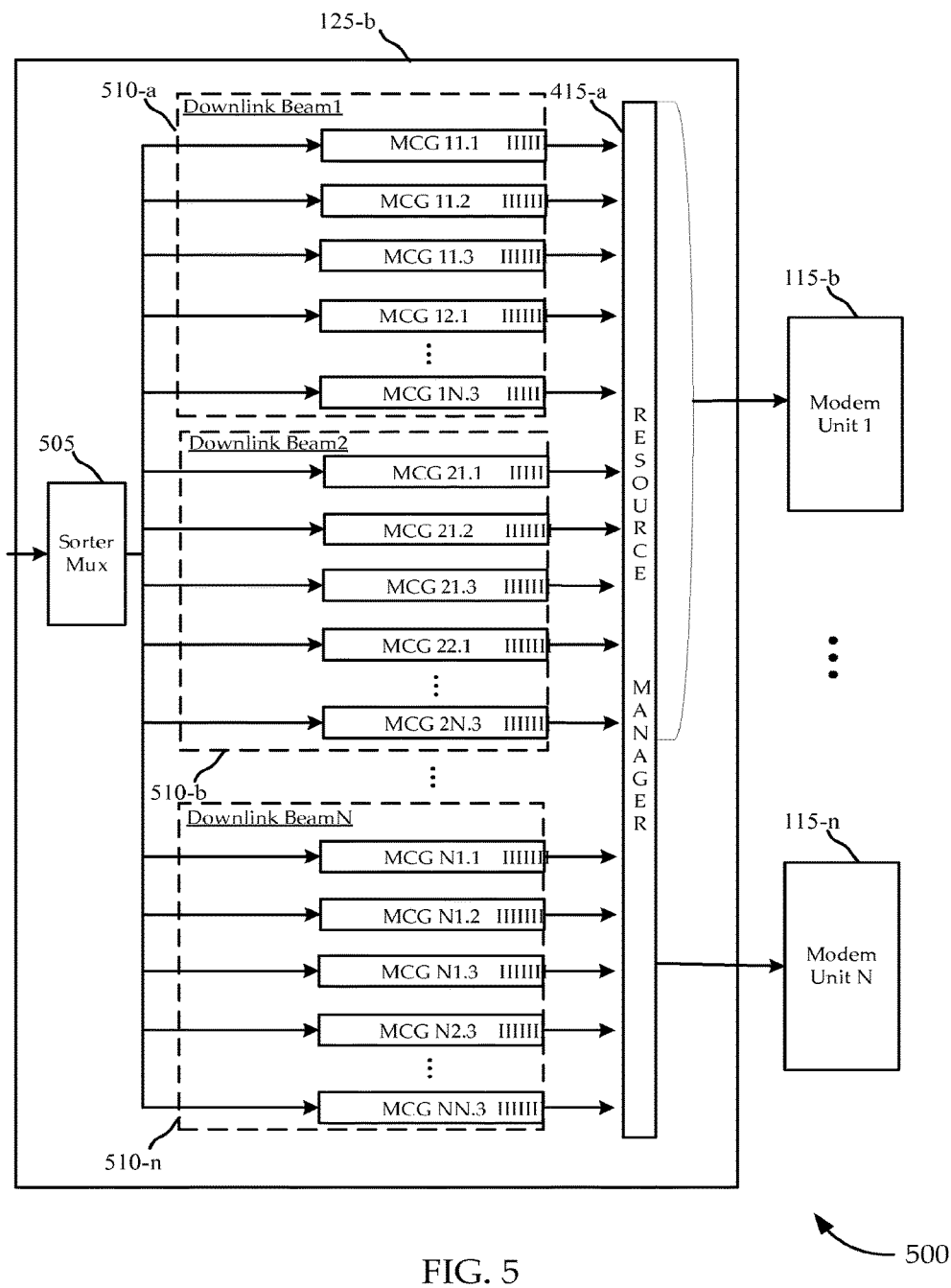
FIG. 5 is a block diagram illustrating a DBRA control unit including a number of queues for dynamically allocating downlink resources among beams according to various embodiments of the invention.

Turning to FIG. 5, a block diagram is shown illustrating an example of a DBRA control unit 125-b (e.g., the DBRA control unit 125 of FIG. 1 or 4). As packets pass through a satellite (e.g., satellite 105 of FIG. 1) from an uplink to a downlink, they may pass through a router unit 155 before being encoded, modulated, and up converted for transmission via the downlink. These data packets may be grouped as MCGs, with each group including packets that are 1) destined to the same beam (e.g., beam 150 of FIGS. 1), and 2) have the same modulation and coding designation.

The data packets may enter a mux 505 after entering the DBRA control unit 125-b, which may distribute the packets to different queues based on the packet's MCG and class. The mux 505 may be the beam sorter module 405 and MCG sorter module 410 of FIG. 4. Thus, each queue may include those packets which 1) are destined to terminals in the same beam, 2) will be assigned the same modulation and coding format, and 3) are in the same traffic class. For example, assuming 3 traffic classes, MCG 11.1 may be a queue for the packets to be assigned BPSK (1/4) Class 1 traffic for Beam 1, MCG 11.2 may be a queue for the packets to be assigned BPSK (1/4) Class 2 traffic for Beam 1 (same MCG, but different queue because Class 2 traffic), and so on up to MCG 1N.3 which may be a queue for the packets to be assigned QAM (7/8) for class 3 traffic for Beam 1; MCG 21.1 may be a queue for the packets to be assigned BPSK (1/3) for class 1 traffic for Beam 2, MCG 21.2 may be a queue for the packets to be assigned BPSK (1/3) for class 2 traffic for Beam 2, and so on up to MCG 2N. 3 which may be a queue for the packets to be assigned QAM (5/6) class 3 traffic for Beam 2, and so on up to beam N. It is worth noting that in other embodiments other queuing schemes may be used. For example, queues may have combined traffic classes (e.g., there may be one or more MCGs per queue), or have further differentiation among traffic classes. Moreover, the MCG for beams using the same frequency range may be combined in the same queue. A range of alternatives will be apparent to those skilled in the art.

A resource manager 415-a (e.g., resource manager 415 of FIG. 4) may measure the traffic passing through the queues, and also receive or otherwise identify terminal 130 parameters. The resource manager 415 may estimate bandwidth required for the different MCGs, utilizing the measured traffic and terminal parameters to define bandwidth requirements based on a range of metrics. The resource manager 415-a may then allocate bandwidth to each MCG, utilizing one of a range of fairness policies if there is insufficient bandwidth. Using the allocation information, modulators may be assigned to beams (e.g., in each modem unit 115-a, there may be one modulator to be shared by a number of beams). In other embodiments, MCGs within each beam may be assigned to different modulators. The available ranges of frequencies, and time slots within those frequencies, may then be assigned to each MCG.

Figure 6:
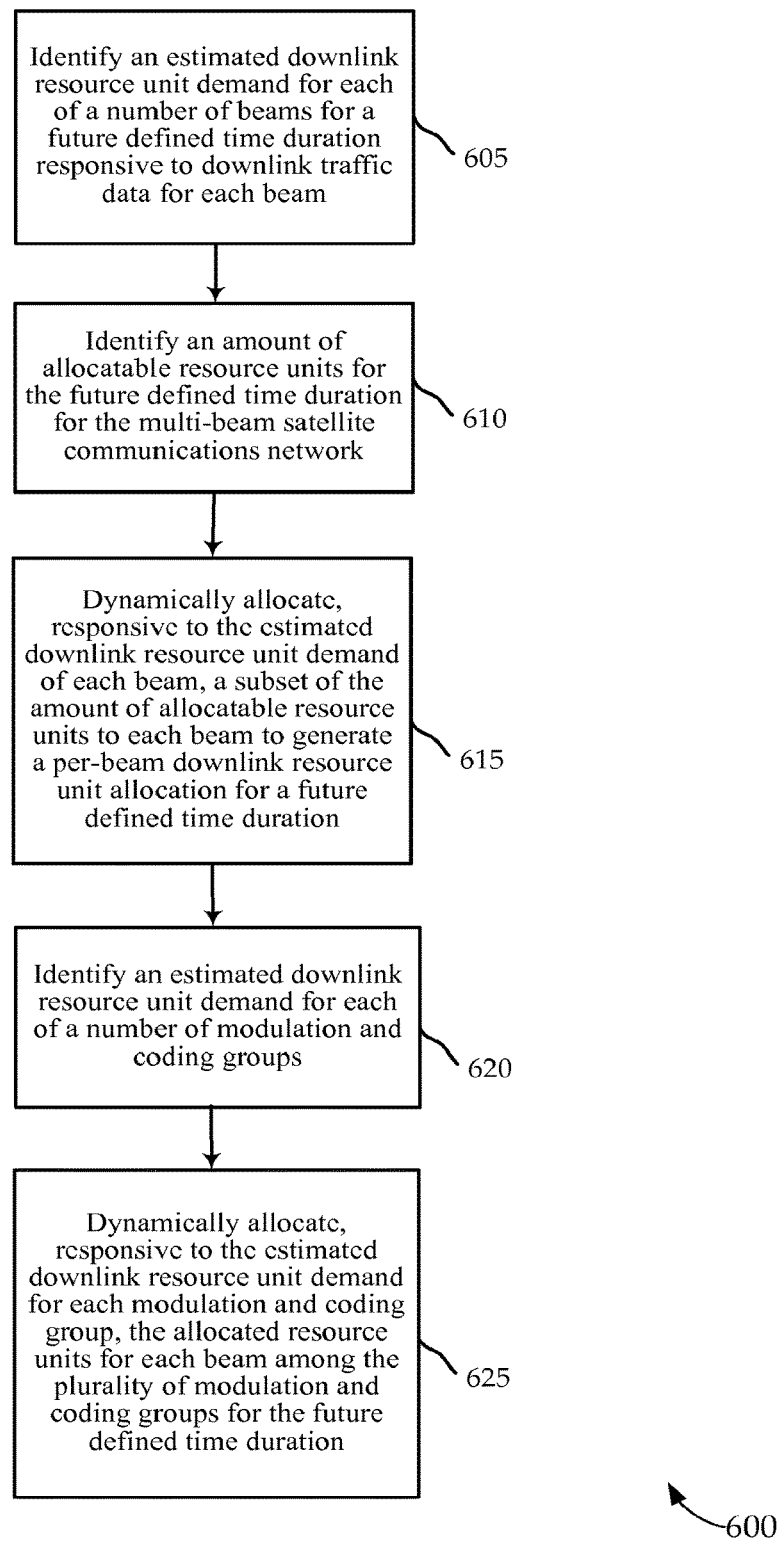
FIG. 6 is a flowchart illustrating a method of downlink resource allocation among beams across allocation periods according to various embodiments of the invention.

FIG. 6 is a flowchart illustrating a method 600 of dynamic resource allocation across allocation periods. The method 600 may, for example, be performed by the DBRA control unit 125 of FIG. 1,4, or 5, the NCC 140 of FIG. 1, or any combination thereof. The method 600 may be performed using the configuration 200 of FIG. 2 or the configuration 300 of FIG. 3, as well.

At block 605, an estimated downlink resource unit demand is identified for each of a number of beams for a future defined time duration responsive to downlink traffic data for each beam. At block 610, an amount of allocatable resource units for the future defined time duration is identified for the multi-beam satellite communications network. At block 615, responsive to the estimated downlink resource unit demand of each beam, a subset of the amount of allocatable resource units is dynamically allocated to each beam to generate a changed per-beam downlink resource unit allocation for a future defined time duration. At block 620, an estimated downlink resource unit demand is identified for each of a number of modulation and coding groups. At block 625, responsive to the estimated downlink resource unit demand for each modulation and coding group, the allocated resource units for each beam are dynamically allocated among the plurality of modulation and coding groups for the future defined time duration.

Figure 7:
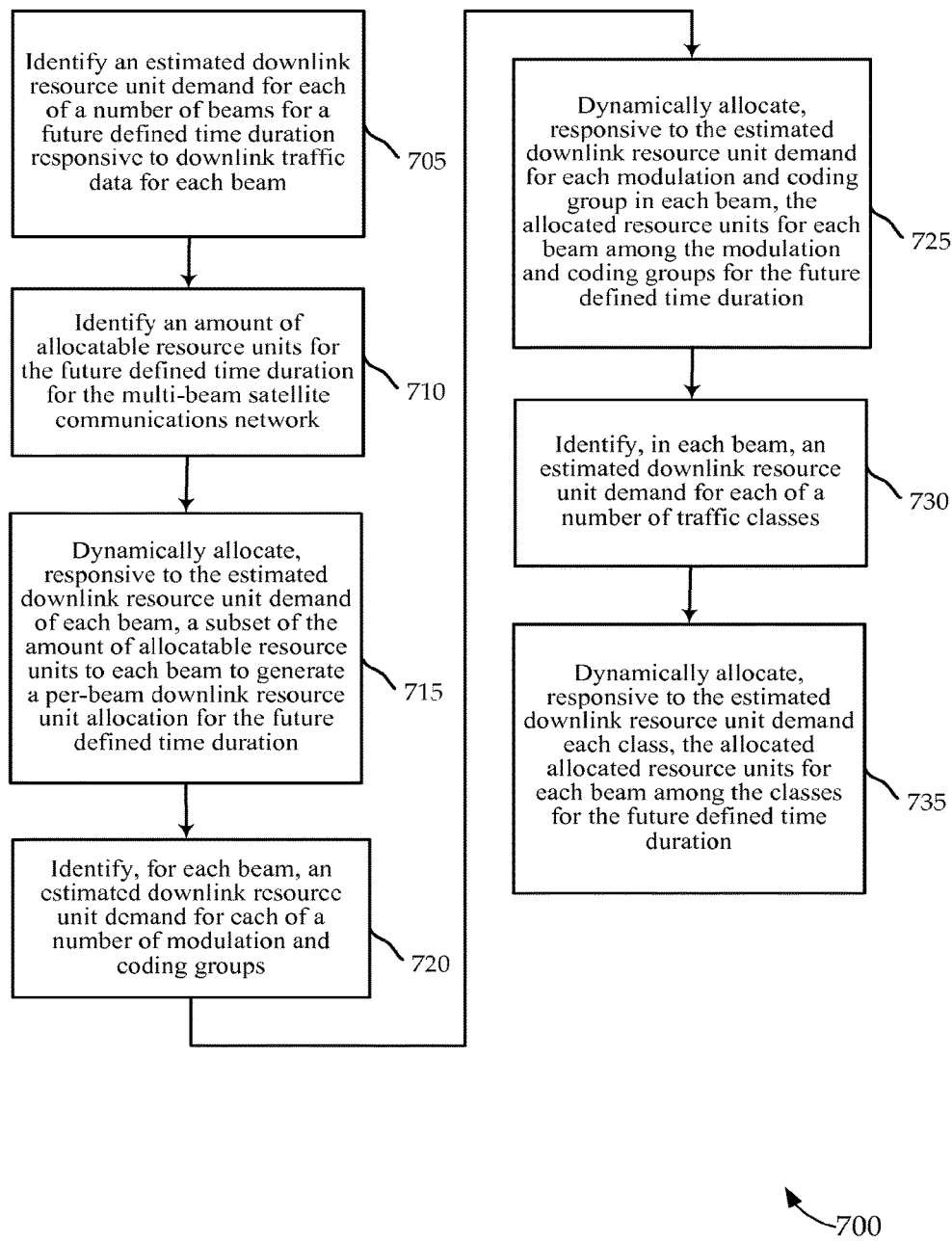
FIG. 7 is a flowchart illustrating a method of downlink resource allocation among beams, modulation and coding groups, and classes according to various embodiments of the invention.

FIG. 7 is a flowchart illustrating an alternative method 700 of dynamic resource allocation across allocation periods. The method 700 may, for example, be performed by the DBRA control unit 125 of FIG. 1,4, or 5, the NCC 140 of FIG. 1, or any combination thereof. The method 700 may be performed using the configuration 200 of FIG. 2 or the configuration 300 of FIG. 3, as well.

At block 705, an estimated downlink resource unit demand is identified for each of a number of beams for a future defined time duration responsive to downlink traffic data for each beam. At block 710, an amount of allocatable resource units is identified for the future defined time duration for the multi-beam satellite communications network. At block 715, responsive to the estimated downlink resource unit demand of each beam, a subset of the amount of allocatable resource units is dynamically allocated to each beam to generate a changed per-beam downlink resource unit allocation for the future defined time duration.

At block 720, an estimated downlink resource unit demand is identified for each beam for each of a number of modulation and coding groups. At block 725, responsive to the estimated downlink resource unit demand for each modulation and coding group in each beam, the allocated resource units for each beam are dynamically allocated among the modulation and coding groups for the future defined time duration. At block 730, an estimated downlink resource unit demand is identified in each beam for each of a number of traffic classes. At block 735, responsive to the estimated downlink resource unit demand of each class, the allocated resource units for each beam are dynamically allocated among the classes for the future defined time duration. This may be undertaken on a per-beam, or per MCG basis.

Figure 8:
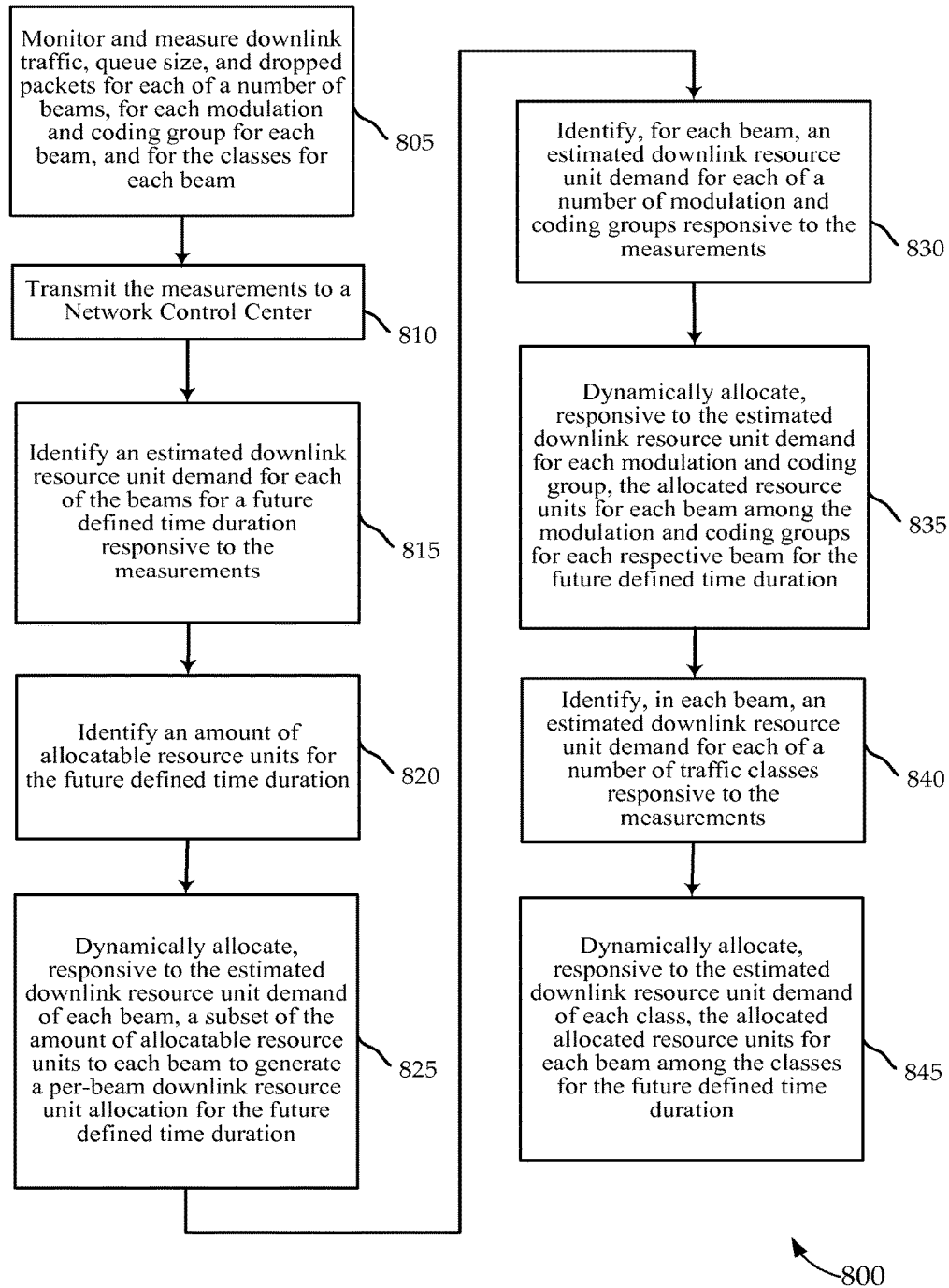
FIG. 8 is a flowchart illustrating a method of dynamic resource allocation via a network control center according to various embodiments of the invention.

FIG. 8 is a flowchart illustrating a method 800 of dynamic resource allocation via a Network Control Center (e.g., the NCC 140 of FIG. 1). The method 800 may, for example, be performed by the DBRA control unit 125 of FIG. 1,4, or 5, the NCC 140 of FIG. 1, or any combination thereof. The method 800 may be performed using the configuration 200 of FIG. 2 or the configuration 300 of FIG. 3, as well.

At block 805, downlink traffic, queue size, and dropped packets are monitored and measured for each of a number of beams, for each modulation and coding group for each beam, and for the classes for each beam. At block 810, the measurements are transmitted to a Network Control Center. At block 815, an estimated downlink resource unit demand is identified for each of the beams for a future defined time duration responsive to the measurements. At block 820, an amount of allocatable resource units is identified for the future defined time duration. At block 825, responsive to the estimated downlink resource unit demand of each beam, a subset of the amount of allocatable resource units to each beam is dynamically allocated to generate a per-beam downlink resource unit allocation for the future defined time duration.

At block 830, an estimated downlink resource unit demand is identified for each beam for each of a number of modulation and coding groups responsive to the measurements. At block 835, responsive to the estimated downlink resource unit demand for each modulation and coding group, the allocated resource units for each beam are dynamically allocated among the modulation and coding groups for each respective beam for the future defined time duration. At block 840, an estimated downlink resource unit demand is identified in each beam for each of a number of traffic classes responsive to the measurements. At block 845, responsive to the estimated downlink resource unit demand of each class, the allocated resource units for each beam are dynamically allocated among the classes for the future defined time duration.

Figure 9:
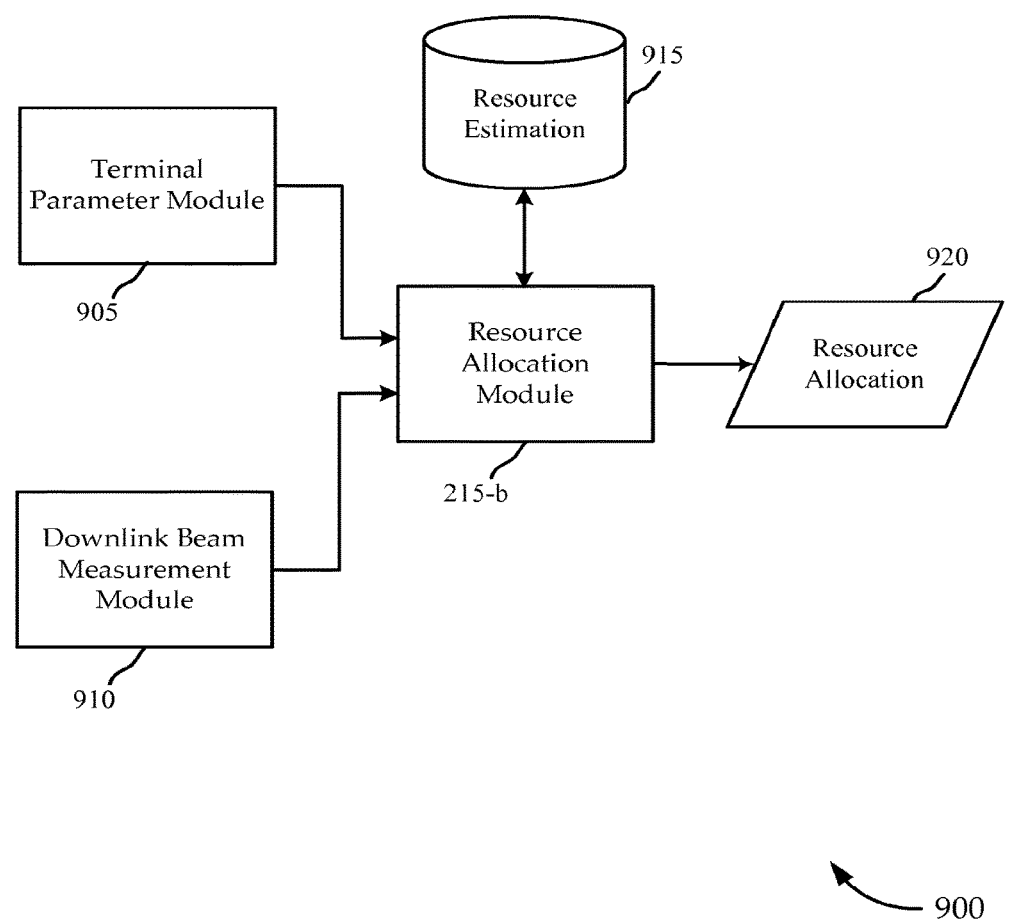
FIG. 9 is a block diagram of a configuration using a resource allocation module to generate resource estimates and dynamically allocate available resources according to various embodiments of the invention.

II. Resource Estimation and Allocation:

FIG. 9 is a high-level block diagram showing an example configuration 900 illustrating how a resource allocation module 215-b (e.g., the resource allocation module 215 of FIG. 2 or 3) may use various inputs to generate resource estimates and dynamically allocate available resources. This configuration 900 may be implemented in the system 100 of FIG. 1 or, more specifically, in the NCC 140 of FIG. 1, the DBRA control unit 125 of FIG. 1,4, or 5, or any combination thereof. However, some or all of the functionality of these modules may be implemented in other devices or sets of devices.

The configuration 900 includes a terminal parameter module 905, a downlink beam measurement module 910, a resource allocation module 215-b (which may be the resource allocation module 215 of FIG. 2 or 3), and a resource estimation datastore 915, which may each be in communication with each other. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application specific processors. The resource allocation output 920 is illustrated, as well.

A terminal parameter module 905 may be configured to aggregate terminal parameter information to identify a cumulative guaranteed rate for each of the beams (e.g., beams 150 of FIG. 1). The cumulative guaranteed downlink rate may be a committed information rate, or may be a combination of a minimum sustained rate and a committed information rate for the terminals (e.g., terminals 130 of FIG. 1) of each respective beam, as will be discussed in more detail below. Some or all of the terminals may transmit their terminal parameters to the satellite (e.g., satellite 105 of FIG. 1), although this information may be gathered in other ways, as well. This information may be based on any combination of service level agreement (SLA) information, past and estimated future bandwidth needs, and may, for example, be sent every epoch, every n epochs, or whenever bandwidth needs change in excess of a threshold. The parameter information may be updated or aggregated every n epochs, and may occur more regularly when traffic needs are varying more rapidly. It is worth noting that while in one embodiment the satellite performs this allocation and assignments; in other embodiments, all or part of this functionality may be performed by an Nee (e.g., Nee 140 of FIG. 1). It is also worth noting that while the terminal parameters may be sent from each terminal, this information may also be generated by, stored at, or delivered from other sources (e.g., from the Nee).

A downlink beam measurement module 910 may measure, or otherwise estimate, downlink data traffic directed to each beam. The traffic measurements may, in some embodiments, be received by the downlink beam measurement module 910 from another source. The downlink beam measurement module 910 may be configured to identify a measured rate of downlink resource units for each of the beams (e.g., for defined past time duration), and identify, for each beam, an amount by which the measured rate exceeds the guaranteed downlink rate. This may be referred to herein as the "excess measured rate."

The downlink beam measurement module 910 may measure satellite queue size changes attributable to each beam, and calculate dropped packets. The measured rate of downlink resource units may be calculated to account for the queue size changes and the dropped packets. As noted, the downlink beam measurement module 910 may be implemented on the satellite (e.g., satellite 105 of FIG. 1), and the measurements may occur on the satellite.

A resource allocation module 215-b (e.g., the resource allocation module of FIG. 2 or 3), may receive the terminal parameter information (from the terminal parameter module 905) and the traffic measurements (from the downlink beam measurement module 910). The resource allocation module 215-b may use received information to estimate resources needed for each beam, and store the estimation on the resource estimation datastore 915. The resource allocation module 215-b may identify an amount of allocatable downlink resource units for a future defined time duration. The resource allocation module 215-b may use the estimation to dynamically generate resource allocation data 920 for the future defined time duration. The resource allocation module 215-b may allocate a portion of allocatable downlink resource units among each of the plurality of beams for the future defined time duration. This allocation may correspond proportionally to the cumulative guaranteed downlink information rate for each beam. The resource allocation module 215-b may allocate, after the first portion is allocated, a remaining portion of the allocatable downlink resource units among each of the plurality of beams for the future defined time duration. This allocation may proportionally correspond to the respective excess measured rate for each beam.

In one embodiment, the downlink beam measurement module 910 measures an amount of downlink resource units directed to each beam over a past time period substantially equal in length to the future time allocation period, although in some embodiments, the measurement period may be longer or shorter. As noted, the resource estimation and allocation may be made every n epochs, and may occur more regularly when traffic needs are varying more rapidly.

FIG. 10 is a diagram that illustrates a table 1000 of terminal parameter information that may be sent from a terminal 130 to a satellite 105 (or NCC 140) of FIG. 1. All, or any subset, of the following information may be transmitted from a terminal to provide terminal parameters. For example, a terminal may send a terminal ID 1005 (MAC Address, IP Address, other unique identifier or account number for the terminal). A terminal may also send specific requests for each of a number of classes 1010 of traffic (e.g., voice, interactive data, interactive video, streaming video, or other types of data with different quality of service metrics). For each traffic class (or for a number of traffic classes), a minimum sustained rate 1015 (Min SR) and a committed information rate 1020 (CIR) may each be transmitted. There may also be sub-types of traffic within a class. In other embodiments, a terminal priority (which provides information on the priority of the terminal relative to other terminals), a mode (which may provide information on a requested modulation scheme, coding, a requested carrier group or amount of bandwidth), and a requested rate may also be transmitted and used for resource estimation and allocation purposes.

It is worth noting, moreover, that the information in table 1000 may be forwarded via the satellite 105 to the NCC 140 of FIG. 1, or may be otherwise received by the satellite 105 or NCC 140. The satellite, the NCC, or any combination thereof may perform the resource estimation and allocation. The information may be made up of specific MinSR 1015 and CIR 1020 data, or may be in different forms. For example, the messages may instead reflect other types of guaranteed information rate information. In different embodiments, there may be other formulations reflecting various quality of service or traffic class metrics, and include various types of past traffic or estimated future traffic information. Turning next to FIG. 11, a diagram is shown that illustrates a table 1100 of terminal parameter information. This information may be stored and formatted on a satellite (e.g., in the DBRA control unit 125 of FIG. 1,4, or 5). This table 1100 may be based on the information sent from a terminal 130 to a satellite 105 (or NCC 140) of FIG. 1. This may represent an aggregation of the information sent in the table 1000 of FIG. 10. In one embodiment, the terminal parameters for each terminal on the downlink are stored. In each column, the terminal 1105 is listed (e.g., by terminal ID 1005), the MCG 1110 for the terminal is identified, and the MinSR and CIR for the terminal are listed for each class 1115. In other embodiments, the table may include requested bandwidth, SLA information, terminal priority information, and a number of other types of data may be included and used in estimating resource requirements. The MinSR and CIR values may be specified in bits/second, Kbits/second, or other metric; they may also be converted to a measure of normalized time-slots/epoch. The conversion may be based on the terminal mode (e.g., channel size, modulation, and coding) used to carry the request. Those skilled in the art will recognize the various ways in which the MinSR and CIR bit rate values may be normalized into time slots to ease calculations.

Turning next to FIG. 12, a diagram is shown that illustrates tables 1200 of traffic measurement information (e.g., the traffic measurements made or received by the downlink beam measurement module 910 of FIG. 9). This information may be generated from monitoring on a satellite (e.g., the satellite 105 of FIG. 1), and may be stored on the satellite as well. By way of example, the resource manager (e.g., resource manager 415-*a* of FIG. 5) may monitor the queues. These tables 1200 may be based on other traffic measurement techniques performed, for example, on the satellite or at the NCC (e.g., NCC 140 of FIG. 1). In one embodiment, traffic measurement information for each downlink beam is stored in a separate table. In each column of the example tables, a traffic measurement information for the MCG 1205 of the relevant beam is stored. The tables list the mode 1210 (modcode) for the respective MCGs, and then the measured information rate (MIR) 1215 for each respective queue. These may be the queues described with reference to FIG. 5 (i.e., the queues may each be associated with a different traffic class). In one embodiment, the MIR 1215 is the measured information rate for the MCG 1215 of each queue, but the MIR 1215 could also be estimated. There may be different MIR measures for different queues (and, therefore, for different classes). For example, for the queues with a traffic class for voice, the traffic flow may also include an accounting for queue changes, queue size, and dropped packets. The MIR values may be specified in bits/second, Kbits/second, or other metric; they may also be converted to a measure of normalized time-slots/epoch. The conversion may be based on the terminal mode (e.g., channel size, modulation, and coding) used to carry the request. Those skilled in the art will recognize the various ways in which the MIR bit rate values may be normalized into time slots to ease calculations.

In FIG. 13, a diagram is shown that illustrates tables 1300 of resource estimation information. This information may be generated and formatted on a satellite (e.g., the satellite 105 of FIG. 1). These tables 1300 may be based on the terminal parameters and traffic measurements described with reference to FIGS. 9-12. In one embodiment, the resource estimates are made for each MCG, on each downlink beam. In the illustrated embodiment, there is one table per beam (although in other embodiments, the table may be consolidated). In each column, an MCG 1305 is listed, and the MinSR and CIR (e.g., from the received terminal parameter information) and the MIR (e.g., from the traffic measurements) are listed for each class 1310. In other embodiments, the table may include other requested bandwidth, SLA, and terminal priority information, and a number of other types of data may be included and used in estimating resources. The values may be specified in bits/second, Kbits/second, or other metric; and may be a per epoch or per n epochs measure.

As noted above, there may be a number of bands (channels) of different sizes to be allocated among a set of downlink beams. For example, in one example there is a 120 MHz channel, and time slots of this channel may be allocated to MCGs in each epoch (in this embodiment, 640 ms). Each epoch may be split into different time slices, or bursts; in one embodiment, the time slices are 2 ms each. For a given system, the satellite may be allocated a limited amount of downlink spectrum (e.g., a number of frequency channels); particular channels (and time slots therein) may be allocated to certain MCGs. Thus, while a rate may be used to specify MinSR, CIR, and MIR, these rates may be converted to a measure of normalized time-slots/epoch during bandwidth allocation. The conversion may be based on the mode (e.g., channel size, modulation, and coding). Those skilled in the art will recognize the various ways in which the bit rate values may be normalized into time slots to ease calculations.

Therefore, the downlink DBRA resource allocation process may be initiated by generating and consolidating the information set forth in FIGS. 9-13. A resource manager (e.g., resource manager 215 FIG. 2, 3, or 9) may receive resource estimation information and configuration information. The resource manager may allocate a portion of the available resources for use by each MCG for each beam. For each MCG, the relevant beam may be identified. The resources allocation may occur for a period of n epochs, as estimates for MCGs may be somewhat stable over time (e.g., for epochs of 640 ms, n may equal 8, 10, 20, 50, or 100). First, the MinSR may be allocated for the MCGs, then the CIR allocated for the MCGs (the allocated MinSR and CIR may together make up the GIR (guaranteed information rate). These allocations may be by number of normalized time slots. After the GIR is allocated, the remaining available bandwidth may be allocated according to the AIR (allocated information rate), which for example is the MIR. If, during the allocation of the MinSR, CIR, or RIR, bandwidth available for allocation is depleted, the allocation at the relevant level may be accomplished using certain fairness policies, set forth below.

Figure 14:
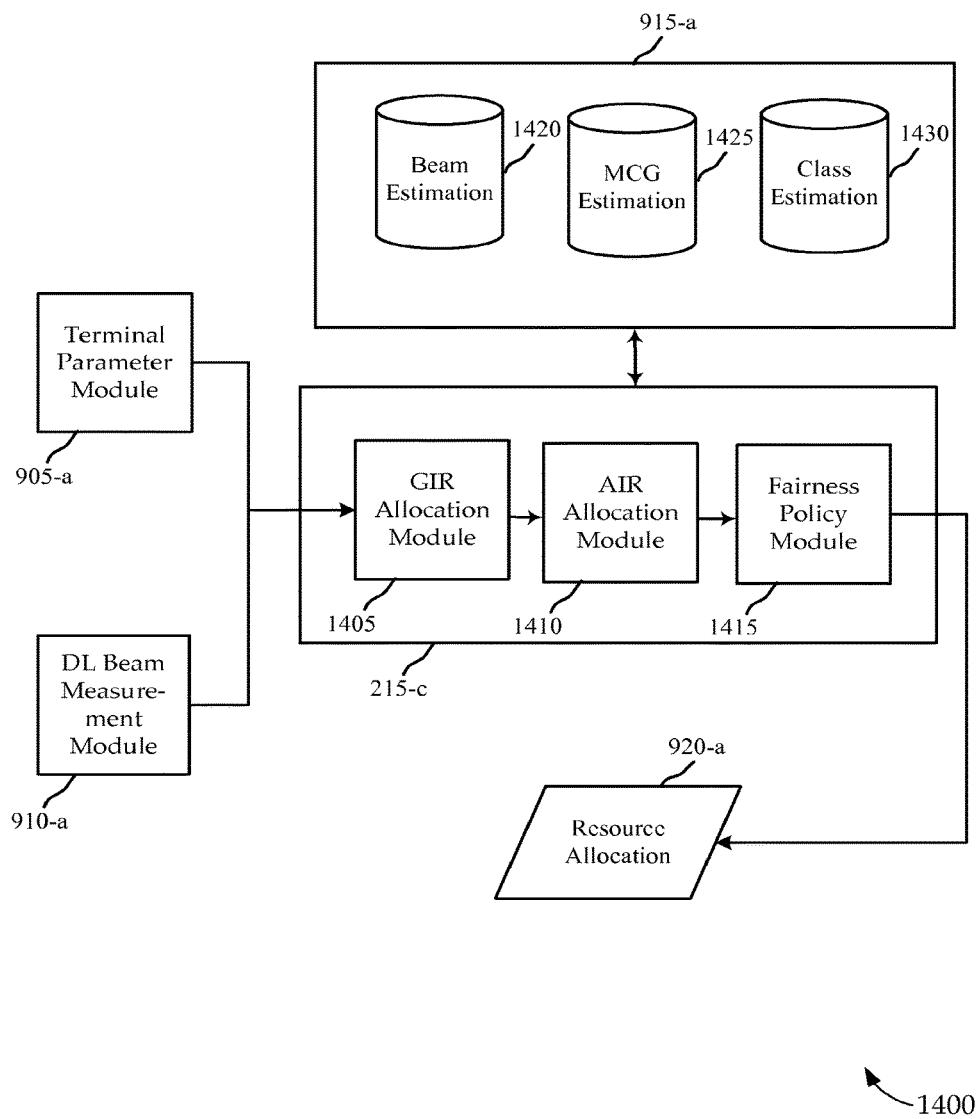
FIG. 14 is a block diagram of a system illustrating a resource allocation module to generate resource estimates and dynamically allocate available resources according to various embodiments of the invention.

FIG. 14 is a block diagram showing an system 1400 illustrating an example of how a resource allocation module 215-*c* (e.g., the resource allocation module 215 of FIG. 2, 3, or 9) may use various inputs to generate resource estimates and dynamically allocate available resources. This system 1400 may be implemented in the satellite communications system 100 of FIG. 1 or, more specifically, in the NCC 140 of FIG. 1, the DBRA control unit 125 of FIG. 1,4, or 5, or any combination thereof. However, some or all of the functionality of these modules may be implemented in other devices or sets of devices.

The system 1400 includes a terminal parameter module 905-*a*, a downlink beam measurement module 910-*a*, a resource allocation module 215-*c* (which may be the resource allocation module 215 of FIG. 2, 3, or 9), and a resource estimation datastore 915-*a*, which may each be in communication with each other. In this embodiment, the resource allocation module 215-*c* includes a GIR allocation module 1405, AIR allocation module 1410, and a fairness policy module 1415. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. The resource estimation datastore 915-a includes a beam estimation 1420 datastore, and MCG estimation 1425 datastore, and a class estimation 1430 datastore. The resource allocation output 920-a is illustrated, as well.

The terminal parameter module 905-a may be configured to aggregate terminal parameter information to identify a cumulative guaranteed rate for each of the beams (e.g., beams 150 of FIG. 1). The cumulative guaranteed downlink rate may be a committed information rate, or may be a combination of a minimum sustained rate and a committed information rate, for the terminals (e.g., terminals 130 of FIG. 1) of each respective beam. Some or all of the terminals may transmit their terminal parameters to the satellite (e.g., satellite 105 of FIG. 1), although this information may be gathered in other ways, as well. The terminal parameter module 905-a may have any of the other functionality described with reference to the terminal parameter module 905 of FIG. 9.

The downlink beam measurement module 910-a may measure, or otherwise estimate, downlink data traffic directed to each beam. The traffic measurements may, in some embodiments, be received by the downlink beam measurement module 910-a from another source. The downlink beam measurement module 910-a may have any of the other functionality described with reference to the downlink beam measurement module 910 of FIG. 9.

The resource allocation module 215-c may receive the terminal parameter information (from the terminal parameter module 905-a) and the traffic measurements (from the downlink beam measurement module 910-a). The GIR allocation module 1405, AIR allocation module 1410, and a fairness policy module 1415 therein may use received information to estimate resources needed for each beam, and aggregate and store the estimation information in the resource estimation data store 915-a. The estimates may be made on a per-beam basis, and the per-beam estimation may be stored in the beam estimation 1420 datastore. The estimates may be made on a per-MCG basis (e.g., by a modulation and coding group estimation module (not shown) in the resource allocation module 215-c), and per-MCG estimation may be stored in the MCG estimation 1425 datastore. The estimates may be made on a per-traffic class basis (e.g., for each beam, for each MCG, or system-wide). This traffic class estimation may be made by a traffic class estimation module (not shown) in the resource allocation module 215-c, and per-traffic class estimation may be stored in the class estimation 1425 datastore. The resource estimation datastore 915-a may associate each of these metrics with MinSR, CIR, and MIR amounts (e.g., see the tables 1300 FIG. 13).

The resource allocation module 215-c may identify an amount of allocatable downlink resource units for a future defined time duration. The resource allocation module 215-c may use the estimation to dynamically generate resource allocation data 920 for the future defined time duration. More specifically, the GIR allocation module 1405 may use the estimates from the resource estimation datastore 915-a to allocate a portion of allocatable downlink resource units among each of the plurality of beams for the future defined time duration. This allocation among beams may correspond proportionally to the cumulative guaranteed downlink information rate for each beam.

The GIR allocation module 1405 may allocate, responsive to the estimated downlink resource unit demand for each of the modulation and coding groups in each respective beam, the allocated resource units for each beam among the modulation and coding groups for the future defined time duration. The GIR allocation module 1405 may allocate, responsive to the estimated downlink resource unit demand for each of the traffic classes in each respective beam, the allocated resource units for each beam among the traffic classes for the future defined time duration.

After the GIR allocation for the future time duration is complete, the AIR allocation module 1410 may allocate remaining portion of the allocatable downlink resource units among each of the for the future defined time duration. This allocation may proportionally correspond to the respective excess measured rate for each beam. The AIR allocation module 1410 may allocate, responsive to the estimated downlink resource unit demand for each of the modulation and coding groups in each respective beam, the remaining portion of allocated resource units for each beam among the modulation and coding groups for the future defined time duration. The AIR allocation module 1410 may allocate, responsive to the estimated downlink resource unit demand for each of the traffic classes in each respective beam, the allocated resource units for each beam among the traffic classes for the future defined time duration.

The GIR allocation module 1405 and AIR allocation module 1410 may, as the allocation process is proceeding, monitor and determine whether a sufficient amount of the allocatable resource units remain to satisfy an allocation. If it is determined that there is not a sufficient amount of allocatable resource units remaining to satisfy an allocation, the fairness policy module 1415 may take over and allocate a remainder of the allocatable resource units among the plurality of beams according to a fairness policy.

Figure 15:
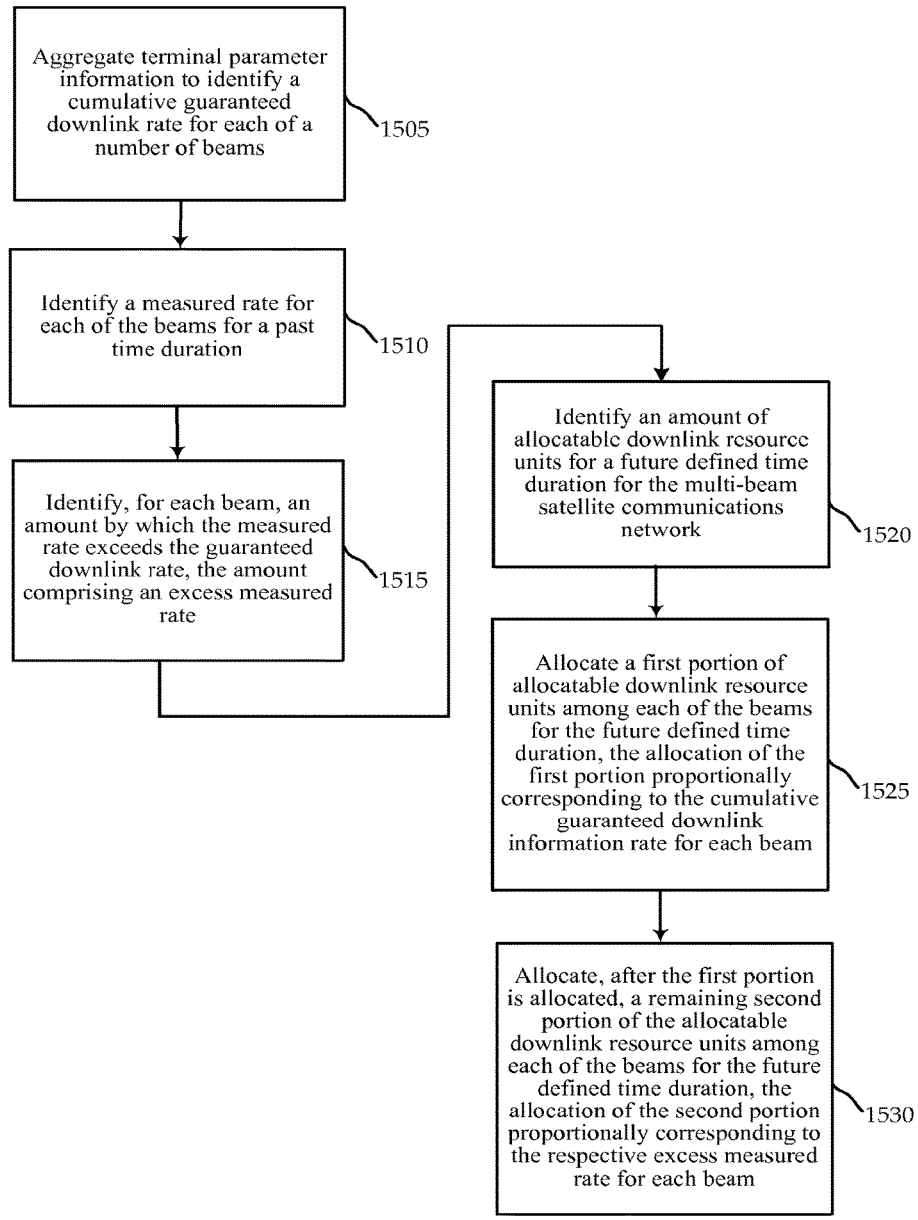
FIG. 15 is a flowchart illustrating a method of resource allocation for downlink beams in a multi-beam satellite system according to various embodiments of the invention.

FIG. 15 is a flowchart illustrating a method 1500 of resource allocation for downlink beams in a multi-beam satellite system, according to various embodiments of the invention. The method 1500 may, for example, be performed by the DBRA control unit 125 of FIG. 1,4, or 5, the NCC 140 of FIG. 1, or any combination thereof. The method may be performed by the resource allocation module 215 of FIG. 2, 3, 9, or 14, as well.

At block 1505, terminal parameter information is aggregated to identify a cumulative guaranteed downlink rate for each of a number of beams. At block 1510, a measured rate is identified for each of the beams for a past time duration. At block 1515, an amount by which the measured rate exceeds the guaranteed downlink rate is identified for each beam, the amount comprising an excess measured rate. At block 1520, an amount of allocatable downlink resource units is identified for a future defined time duration. At block 1525, a first portion of allocatable downlink resource units is allocated among each of the beams for the future defined time duration, the allocation of the first portion proportionally corresponding to the cumulative guaranteed downlink information rate for each beam. At block 1530, after the first portion is allocated, a remaining second portion of the allocatable downlink resource units is allocated among each of the beams for the future defined time duration, the allocation of the second portion proportionally corresponding to the respective excess measured rate for each beam.

Figure 16:
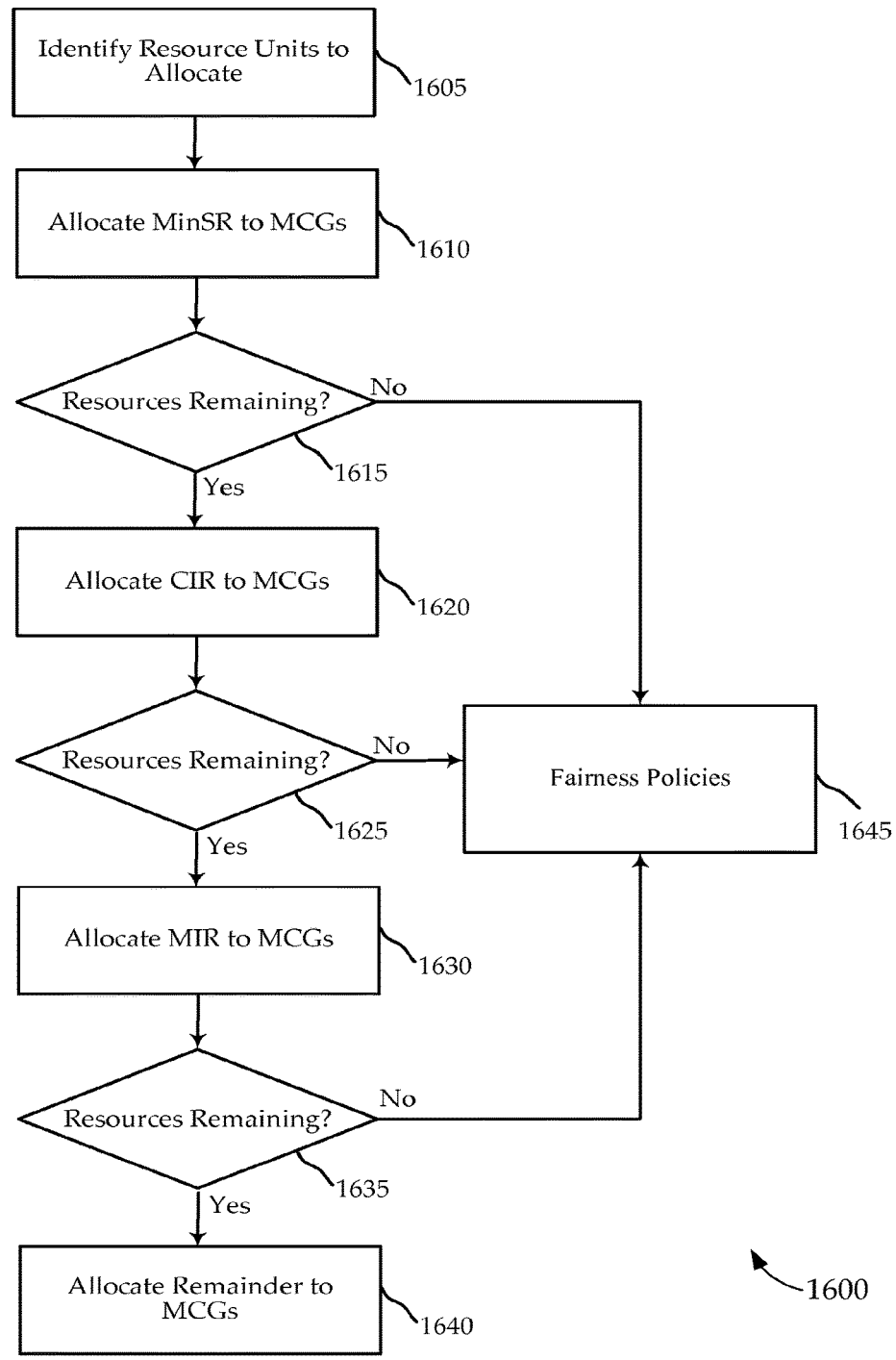
FIG. 16 is a flowchart illustrating an order for downlink resource allocation according to various embodiments of the invention.

FIG. 16 is a flowchart illustrating a method 1600 of downlink resource allocation over n epochs, and the manner in which such resources may be distributed among MCGs. The method 1600 may, for example, be performed by the DBRA control unit 125 of FIG. 1, 4, or 5, the NCC 140 of FIG. 1, or any combination thereof. The method may be performed by the resource allocation module 215 of FIG. 2, 3, 9, or 14, as well.

At block 1605, the amount of resource units to allocate is identified. At block 1610, the MinSR (e.g., from the resource estimate 1300 of FIG. 13) over the n epochs is allocated to MCGs. Thus, the MinSR bandwidth for all MCGs may be allocated. If a determination at block 1615 is made during these allocations that there is insufficient bandwidth to allocate the MinSR, the MinSR may be allocated according to fairness policies 1645 (e.g., Proportional, Weighted Proportional, Fair Share, or Weighted Fair Share, which will be discussed in more detail below).

If resource units remain available for allocation, at block 1620, the CIR requests over the n epochs are allocated to the MCGs. This CIR request may be the CIR request less the previously allocated MinSR. The requested CIR bandwidth for all MCGs may be allocated, but if a determination at block 1625 is made that there is insufficient bandwidth to allocate this CIR, the CIR may be allocated according to fairness policies 1645. Note that the CIR requests may be done first, instead of the MinSR requests, in some embodiments.

If resource units remain available for allocation, at block 1630, the MIR may be allocated to the MCGs. This MIR may be the MIR less the previously allocated CIR and MinSR (e.g., this may be the measured excess rate). The requested MIR for all MCGs may be allocated. If a determination at block 1635 is made that there is insufficient resources to allocate to the MIR, the remaining resources may be allocated according to fairness policies 1645. However, if it is determined that resources remain available at block 1635, the remaining bandwidth may be allocated at block 1640.

The preceding discussion illustrates one example of how downlink resources (or some other measure of capacity) over n epochs may be dynamically allocated to particular MCGs in a multi-beam system. Thus, the sum of the resources allocated to each MCG for the n epochs may be equal to the total bandwidth to be allocated over the n epochs (although in other embodiments, there may be an error margin). Thus, there may be a dynamic allocation of a finite resource (bandwidth) to downlink beams in a multi-beam system. This downlink allocation may be adaptive to changing traffic demands, mobile terminals moving in and out of beams, and weather issues (which may require more bandwidth to transmit the same amount of data). The allocation may be responsive to requests and account for terminal and class priority and the characteristics of the traffic. While the allocation is discussed as occurring over every n epochs, n may vary (occurring more regularly when capacity increases, and less frequently when capacity is plentiful).

While the above discussion identifies some embodiments, it is worth noting that there are a number of alternative options, as well. For example, traffic classes may be considered as well. For example, the class 1 traffic may be allocated for MinSR, CIR, and then RIR; the class 2 traffic may be allocated in priority order for MinSR, CIR, and then RIR; up to the class n traffic allocated for MinSR, CIR, and then RIR. In another example, the class 1 traffic may be allocated for MinSR, and then for CIR; the class 2 traffic may be allocated for MinSR, and then for CIR; up to the class n traffic allocated for MinSR and then CIR; then the MIR traffic may be allocated in priority order without accounting for classes. It is worth noting that may be more, or fewer, traffic classes. It is also worth noting that the MinSR, CIR, and MIR are merely examples, and these traffic request categorizations may be expanded, narrowed, or otherwise refined.

As noted, there are a number of policy options (i.e., fairness policies) for resource sharing when available resources are insufficient to meet aggregate MinSR, CIR, or MIR requests. In some embodiments, a sharing policy provides priority or weighted allocations to the certain classes (e.g., the GS or voice class). Allocations may also be in proportion to the CIR requests for one or more classes at one or more terminals. For traffic in excess of CIR, there may be a different allocation scheme. A number of other possible policies may be used in various embodiments, and such policies may be dynamically or more permanently configurable.

When resources are insufficient to meet aggregate MinSR, CIR, or MIR requests, there are a number of ways the available resources may be distributed. In one embodiment, one of the following policies may be selected depending on when in the process there are insufficient resources: 1) A Proportional policy may distribute insufficient resources in a same percentage of a requested amount across a set of beams, MCGs, or classes; 2) A Weighted Proportional policy may distribute insufficient resources in two or more different percentages across a set of beams, MCGs, or classes (e.g., MCGs for voice or other preferred classes may receive a greater percentage, but the percentage amount may be the same for each class); 3) A Fair Share policy may distribute insufficient resources in a same amount across a set of beams, MCGs, classes, or terminals, while ensuring that no allocation is more than requested; 4) A Weighted Fair Share policy may distribute insufficient resources in two or more same amounts across a set of beams, MCGs, classes, or terminals, while ensuring that no allocation is more than requested. Other policies may be used, such as a policy that when all requests have been filled and there is an extra share to be allocated, a set fraction may be distributed equally among groups.

Figure 17:
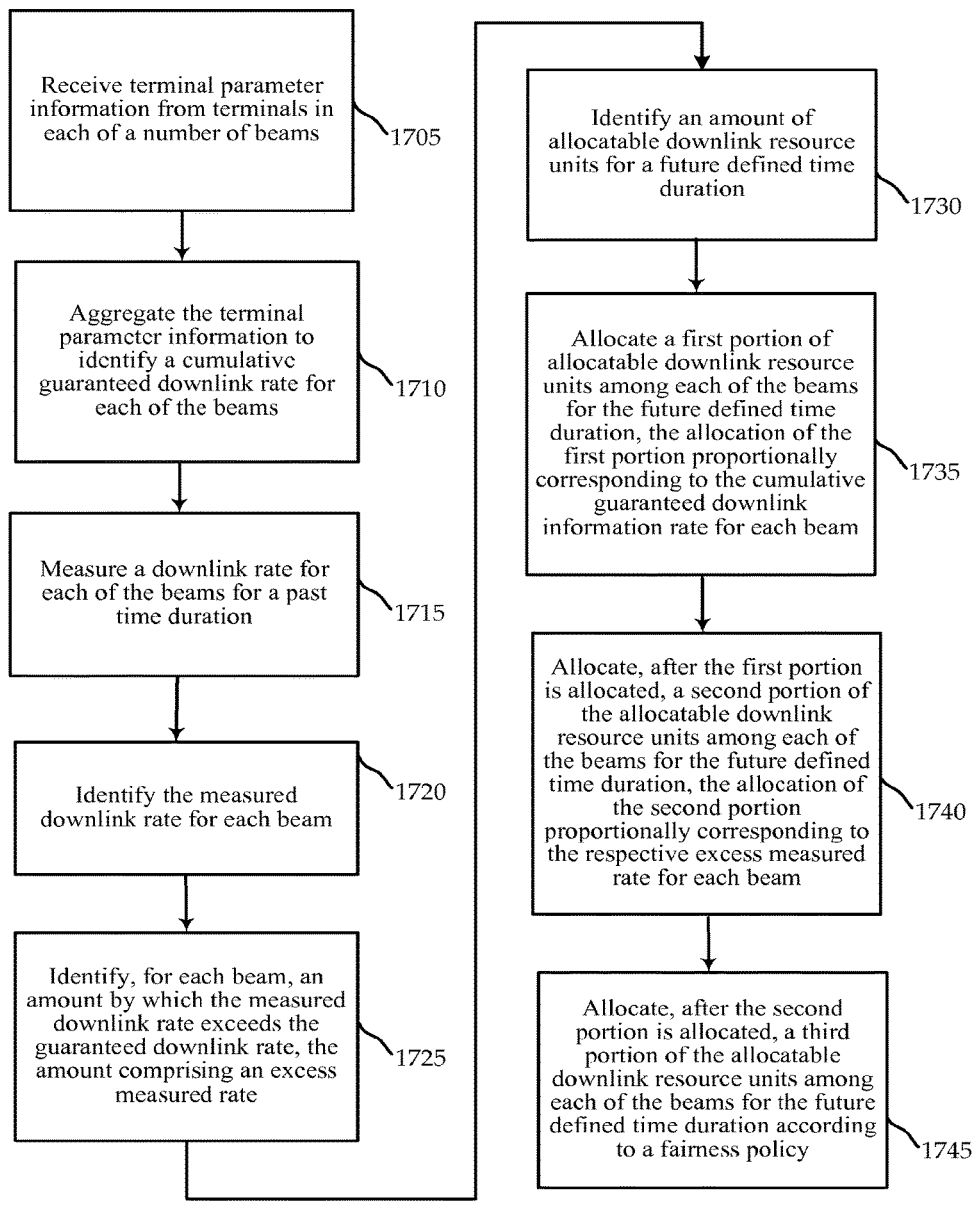
FIG. 17 is a flowchart illustrating ordering for downlink resource allocation according to various embodiments of the invention.

FIG. 17 is a flowchart illustrating a method 1700 of downlink resource allocation over n epochs, and the manner in which such resources may be distributed among MCGs. The method 1700 may, for example, be performed by the DBRA control unit 125 of FIG. 1, 4, or 5, the NCC 140 of FIG. 1, or any combination thereof. The method may be performed by the resource allocation module 215 of FIG. 2, 3, 9, or 14, as well.

At block 1705, terminal parameter information is received from terminals in each of a number of beams. At block 1710, the terminal parameter information is aggregated to identify a cumulative guaranteed downlink rate for each of the beams. At block 1715, a downlink rate is measured for each of the beams for a past time duration. At block 1720, the measured downlink rate is identified for each beam. At block 1725, an amount for each beam is identified by which the measured downlink rate exceeds the guaranteed downlink rate, the amount comprising an excess measured rate.

At block 1730, an amount of allocatable downlink resource units is identified for a future defined time duration. At block 1735, a first portion of allocatable downlink resource units is allocated among each of the beams for the future defined time duration, the allocation of the first portion proportionally corresponding to the cumulative guaranteed downlink information rate for each beam. At block 1740, a second portion of the allocatable downlink resource units is allocated among each of the beams for the future defined time duration after the first portion is allocated, the allocation of the second portion proportionally corresponding to the respective excess measured rate for each beam. At block 1745, a third portion of the allocatable downlink resource units is allocated among each of the beams for the future defined time duration according to a fairness policy after the second portion is allocated.

III. Modulator Assignment and Balancing:

As discussed above, a satellite 105 may have a number of modem units 115, as illustrated in FIG. 1 or 5. Each modem unit 115 may have a single modulator that is shared among a number of downlink beams 150, with each beam served by only a selected one of the modulators. In one embodiment, a modulator is characterized as a module that outputs a waveform for one carrier at any given time period (similarly, a demodulator may be characterized as a module that receives a waveform for one carrier at any given time period). The following discussion will be directed to a modulator, and an assumption may be made that there is one modulator (and one demodulator) per modem unit 115 (note that in other embodiments there may be more than one modulator or demodulator per modem unit 115, there may be different numbers of modulators and demodulators in a given modem unit 115, and/or modulators and demodulators in a given modem unit 115 may serve different beams). In the described embodiment, each downlink beam 150 is assigned to a modulator; in other embodiments, MCGs within a beam may be assigned to different modulators. The modem units 115 (and, thus, the modulators) may be managed by the DBRA control unit 125 of FIG. 1,4, or 5.

Consider an example where there are 25 downlink beams, and 8 modulators on a satellite; such a system may be implemented in the system 100 of FIG. 1. In such a system using TDMA, modulators are a finite resource, as the satellite 105 may be transmitting on the downlink at any given point in time on only eight beams (as there are only eight modulators). Therefore, the proper balancing for the modulators may take on increased importance, particularly as available downlink bandwidth becomes capacity constrained.

Figure 18:
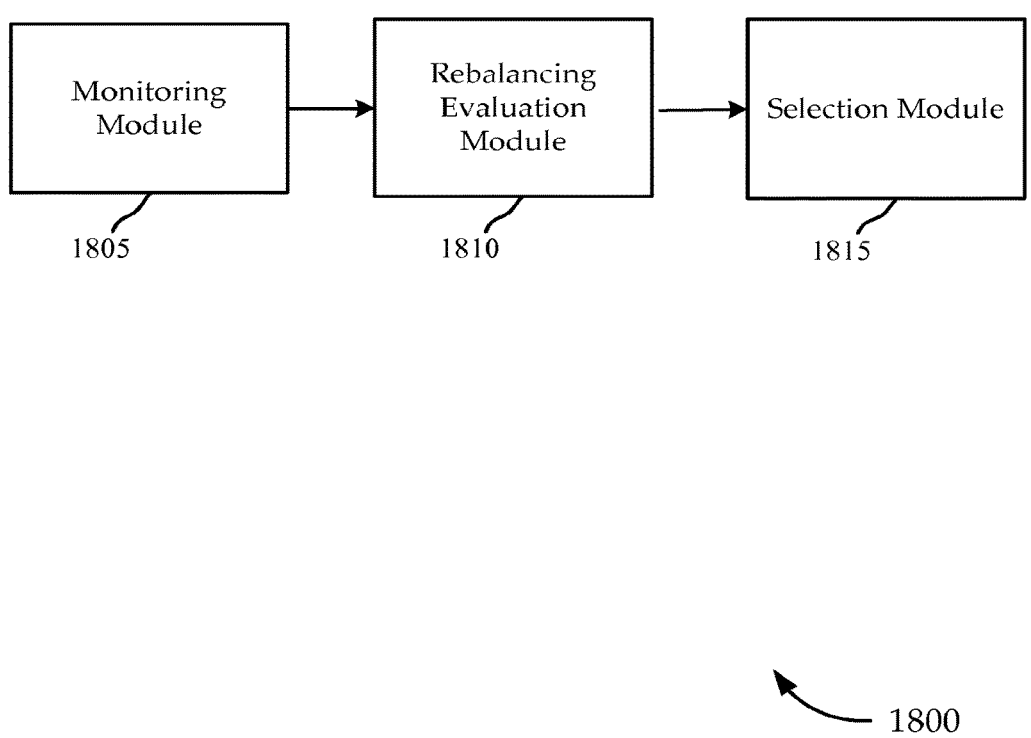
FIG. 18 is a block diagram of a configuration for modulator assignment and balancing according to various embodiments of the invention.

Turning to FIG. 18, a block diagram illustrates an example configuration 1800 to implement the modulator assignment and balancing process. This configuration 1800 may be implemented in the system 100 of FIG. 1 or, more specifically, in the NCC 140 of FIG. 1, the DBRA control unit 125 of FIG. 1,4, or 5, or any combination thereof. The configuration may be implemented in the resource allocation module 215 of FIG. 2, 3, 9, or 14, as well. However, some or all of the functionality of the modules may be implemented in other devices or sets of devices.

The configuration 1800 includes a monitoring module 1805, rebalancing evaluation module 1810, and selection module 1815, which may each be in communication with each other. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

A current assignment of MCGs (and, therefore, beams) to modulators may be used as a starting point in balancing and assigning beams to modulators. Upon system startup, there may be a default assignment, for example, made with the DBRA control unit 125 of FIG. 1,4, or 5. The rebalancing process may be initiated by identifying the current resource allocation for a set of MCGs over n epochs (note that a per-beam resource allocation may be used as well, but MCG allocation will be used in this example). There may, in the alternative, be any number of ways to identify a starting MCG-modulator (or beam-modulator) assignment and initiate a balancing process.

The monitoring module 1805 may receive the current assignment and resource allocation information. The monitoring module 1805 may monitor a traffic load on one or more of the modulators on the satellite. This monitoring may take a number of forms. For 31 example, the monitoring module 1805 may measure data traffic on each of the beams for each modulator over a past time period, and the monitored traffic load may simply be the measured data traffic. In another example, the committed information rate for data traffic on each of the beams served by the modulator may be aggregated, and the monitored traffic load may be the aggregated committed information rate. The monitoring module 1805 may determine that the traffic load exceeds a load threshold on a given modulator (e.g., loaded over a certain threshold that is below capacity by 10% or 15%), and because of this determination, beam re-assignment and balancing may be initiated.

The rebalancing evaluation module 1810 may evaluate whether one or more of the beams serving the overloaded modulator may be moved to a second modulator while maintaining a traffic load on the second modulator below a load threshold for the second modulator. The selection module 1815 may select a beam to be assigned to the second modulator.

The rebalancing evaluation module 1810 may include a comparator to identify an optimal beam to be moved and a second modulator. This identification may be made by determining that a combined traffic load metric on the overloaded modulator and the second modulator after moving the selected beam to the second modulator is lower than a combined traffic load metric from moving any other beams from the overloaded modulator to the second modulator. Alternatively, a determination may be made that a combined traffic load metric on the overloaded modulator and the second modulator after moving the selected beam to the second modulator is lower than a combined traffic load metric from moving the other beams to any of the other modulators. In another example, a determination may be made that a combined traffic load metric on the overloaded modulator and the second modulator after moving the selected beam to the second modulator is lower than a combined traffic load metric from moving the selected beam to any of the other modulators. The rebalancing evaluation module 1810 may include functionality to evaluate switching (e.g., selecting beams serving the second modulator to be switched to the overloaded (or another) modulator to maintain the traffic load on the second modulator below a load threshold for the second modulator.) Thus, while in some embodiments beams may simply be moved to achieve rebalancing, in other embodiments a number of beams may be concurrently switched between modulators.

There are, therefore, a number of alternative options available to achieve beam assignment rebalancing. In one embodiment, each modulator that is overloaded (or loaded above a given threshold) is identified by the monitoring module 1805. For each beam currently assigned to the identified modulator, the rebalancing evaluation module 1810 may then compute the reduced load (L1, based on MIR) if the beam were to be removed. The rebalancing evaluation module 1810 may then compute the increased load (L2, based on MIR) if that beam were to be added to the non-identified modulators. If the max(L1, L2) for one of the [beam, mod] tuples results in both modulators falling below the threshold load, a beam may be moved. If the max(L1, L2) for more than one of the [beam, mod] tuples results in both modulators falling below the threshold load, the beam move that results in the lowest value of max(L1, L2) may be made. However, if no max(L1, L2) for the [beam, mod] tuples results in both modulators falling below the threshold load, additional calculations may be made. For example, for each beam currently assigned to the identified modulator, the rebalancing evaluation module 1810 may compute the reduced load (L1', based on min(CIR, MIR)) if the beam were to be removed. The rebalancing evaluation module 1810 may compute the increased load (L2', based on min(CIR, MIR)) if that beam were to be added to the non-identified modulators. If the max(L1', L2') for one of the [beam, mod] tuples results in both modulators falling below a certain load, a beam may be moved. If the max(L1', L2') for more than one of the [beam, mod] tuples results in both modulators falling below a certain load, the beam move that results in the lowest value of max(L1', L2') may be selected.

It is worth noting that the preceding description of modulator rebalancing may be modified in other embodiments. For example, various calculations for switching a beam assigned to a first modulator and a beam assigned to a second modulator may be employed. Also, calculations for switching sets of beams, or switching beams assigned to more than two modulators, may also be used. In other embodiments, instead of assigning beams to modulators, MCGs from the same beam may be assigned to different modulators. The switching functionality may, therefore, be performed based on MCG movement or switching instead of beam movement or switching.

Figure 19:
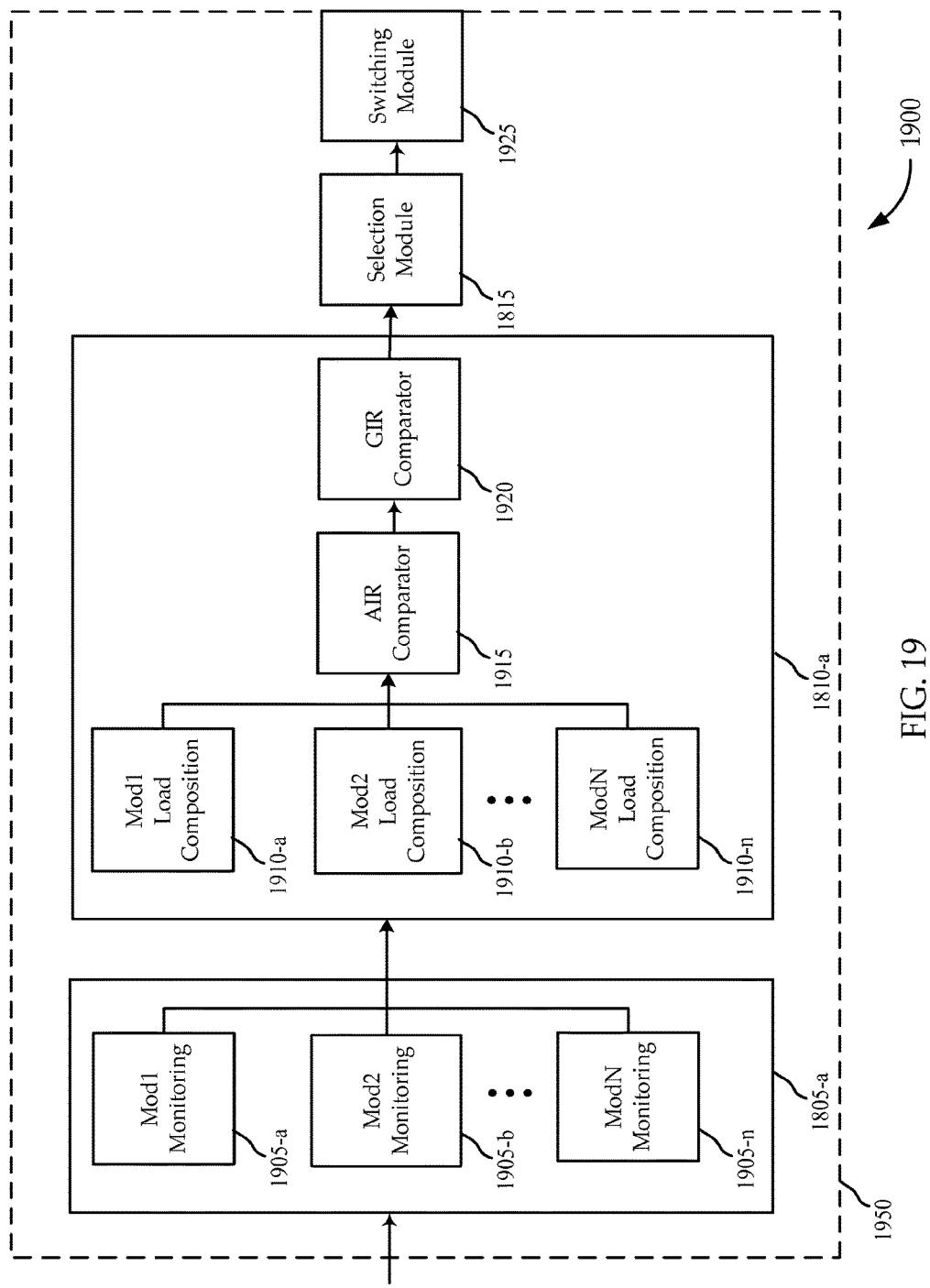
FIG. 19 is a block diagram illustrating a system for modulator assignment and balancing according to various embodiments of the invention.

Turning to FIG. 19, a block diagram illustrates an example system 1900 to implement the modulator assignment and balancing process. This system 1900 may be implemented in the system 100 of FIG. 1 or, more specifically, in the NCC 140 of FIG. 1, the DBRA control unit 125 of FIG. 1, 4, or 5, or any combination thereof. The system 1900 may be implemented in the resource allocation module 215 of FIG. 2, 3, 9, or 14, as well. The system may be the configuration 1800 of FIG. 18. Some or all of the functionality of the modules may be implemented in other devices or sets of devices. The system may be distributed geographically, or may be implemented in a single device 1950.

The system 1900 includes a monitoring module 1805-*a*, a rebalancing evaluation module 1810-*a*, a selection module 1815, and a switching module 1925, which may each be in communication with each other. The monitoring module 1805-*a* includes a number of modulator monitoring 1905 modules (one per modulator). The rebalancing evaluation module 1810-*a* includes modulator load composition 1910 modules (one per modulator), an AIR comparator 1915, and a GIR comparator 1920. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The per-modulator monitoring 1905 modules in the monitoring module 1805-*a* may receive the current assignment and resource allocation information. Each modulator monitoring 1905 module may monitor a traffic load on one of the modulators on the satellite. The per-modulator monitoring 1905 module may determine that the traffic load exceeds a load threshold (e.g., comparing a load threshold to measured data traffic over a past time duration, or comparing a load threshold to a committed information rate for the modulator).

Each modulator load composition 1910 module may identify traffic load components of the modulator (e.g., on a per-beam or a per-MCG basis). Thus, a portion of the traffic load for each modulator may be associated with a beam or an MCG. Going forward with reference to FIG. 19, reference will be made to beams (not MCGs), while noting that in some embodiments selection and switching may instead be done on a per-MCG basis. The modulator load composition 1910 modules may each maintain information on the measured traffic load (for use with the AIR comparator 1915) and on the committed information rate (for use with the GIR comparator 1920).

The AIR comparator 1915 may use a measured traffic load component information to identify one or more beams that may be moved from the overloaded modulator to a second modulator to maintain a measured traffic load on the second modulator below a load threshold for the second modulator. The AIR comparator 1915 may use the measured traffic load composition for each modulator, and compare the movement options to identify options for beam redistribution. A determination may be made regarding which reassignments (e.g., movement of one beam, or switching of beams) result in having a combined load on the modulators being furthest below a threshold. The AIR comparator 1915 may make assessments for both single beam movement and multiple beam switching.

In one embodiment, the AIR comparator 1915 may determine that none of the beams of the overloaded modulator may be moved to a second modulator while maintaining a measured traffic load on a second modulator below a load threshold. If so, a GIR comparator 1920 may identify beams of the overloaded modulator that may be moved to the second modulator while maintaining a committed information rate on the second modulator below a load threshold for the second modulator. Again, a single beam may be switched to a new modulator, or a number of beams may be switched. The threshold for the GIR comparator 1920 assessments may be the same, or different, than the threshold for the AIR comparator 1915 assessments.

Based on results from the AIR comparator 1915 and/or the GIR comparator 1920, the selection module 1815 may select a beam to be moved from the overloaded modulator to the second modulator. The selection module 1815 may identify one or more beams serving the second modulator that may be moved to the overloaded modulator to maintain the traffic load on the second modulator below a load threshold for the second modulator. A switching module 1925 may assign a selected beam from the first modulator to the second modulator. If there are multiple beams selected for assignment, the switching module 1925 may switch the beams concurrently.

Figure 20:
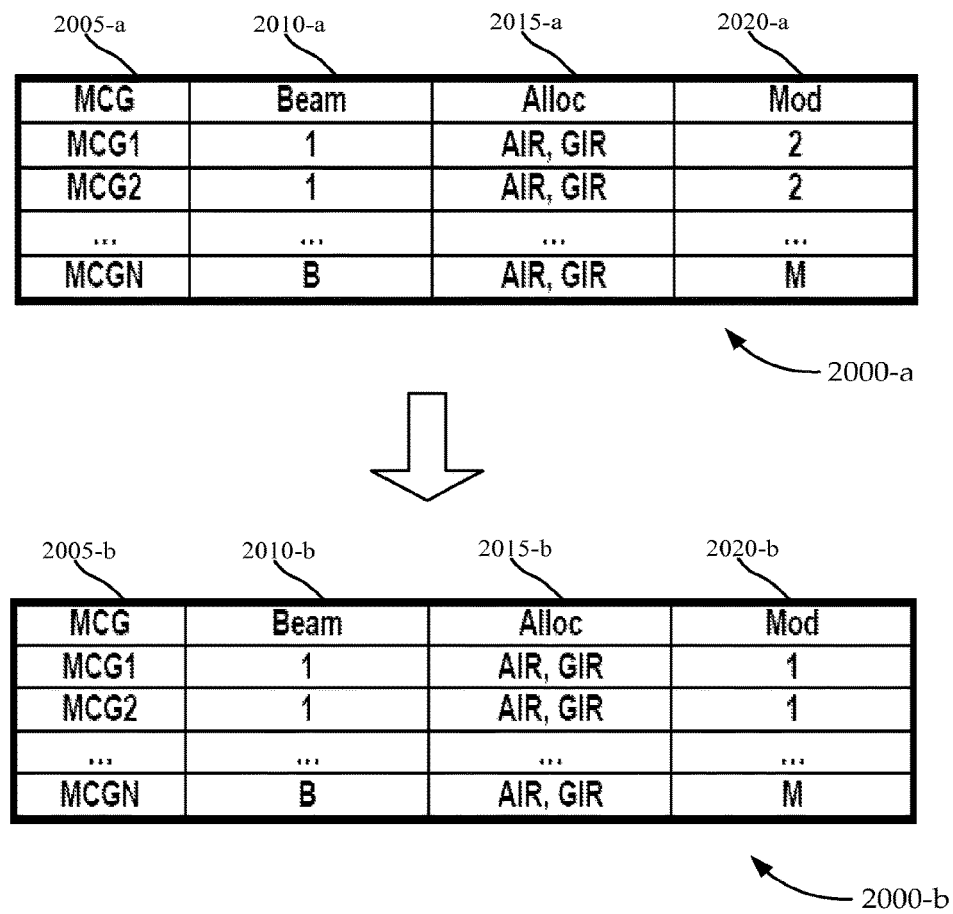
FIG. 20 is a block diagram illustrating tables which may be used to match beams or MCGs to modulators according to various embodiments of the invention.

An example of tables 2000 which may be used to match beams (or MCGs) to modulators is shown in FIG. 20. A first table 2000-a shows the modulator assignments before a rebalancing, and the second table 2000-b shows the rebalanced modulator assignments thereafter. The tables 2000 include a column identifying the MCG 2005 for each respective row, the assigned beam 2010, the traffic load 2015, and the modulator assignment 2020. The tables 2000 illustrate how new modulator assignments 2020-b may change over time.

Figure 21:
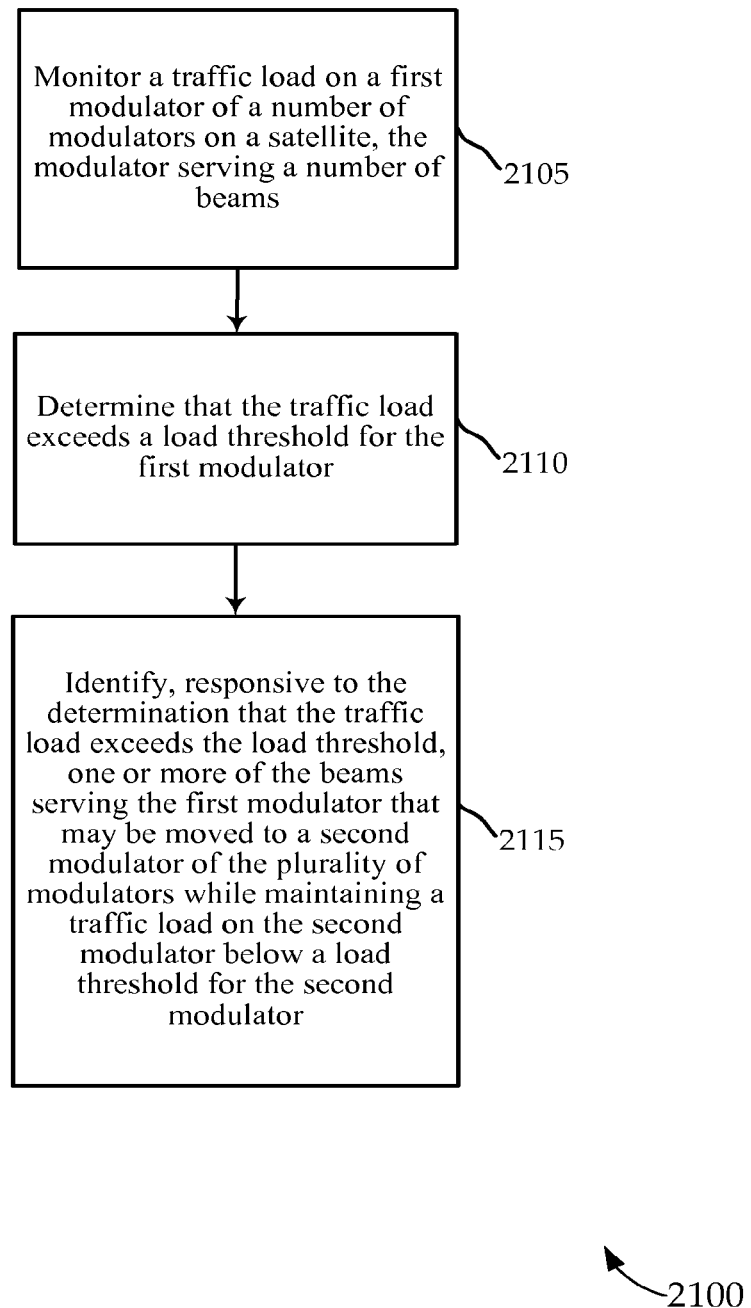
FIG. 21 is a flowchart illustrating a method of beam identification according to various embodiments of the invention.

FIG. 21 is a flowchart illustrating a method 2100 of beam identification according to various embodiments of the invention. The method 2100 may, for example, be performed by the DBRA control unit 125 of FIG. 1,4, or 5, the NCC 140 of FIG. 1, or any combination thereof. The method may be performed by the configuration 1800 of FIG. 18, or the system 1900 of FIG. 19.

At block 2105, a traffic load is monitored on a first modulator of a number of modulators on a satellite, the modulator serving a number of beams. At block 2110, a determination is made that the traffic load exceeds a load threshold for the first modulator. At block 2115, one or more of the beams serving the first modulator are identified that maybe moved to a second modulator of the plurality of modulators while maintaining a traffic load on the second modulator below a load threshold for the second modulator. This identification is made in response to the determination that the traffic load exceeds the load threshold.

Figure 22:
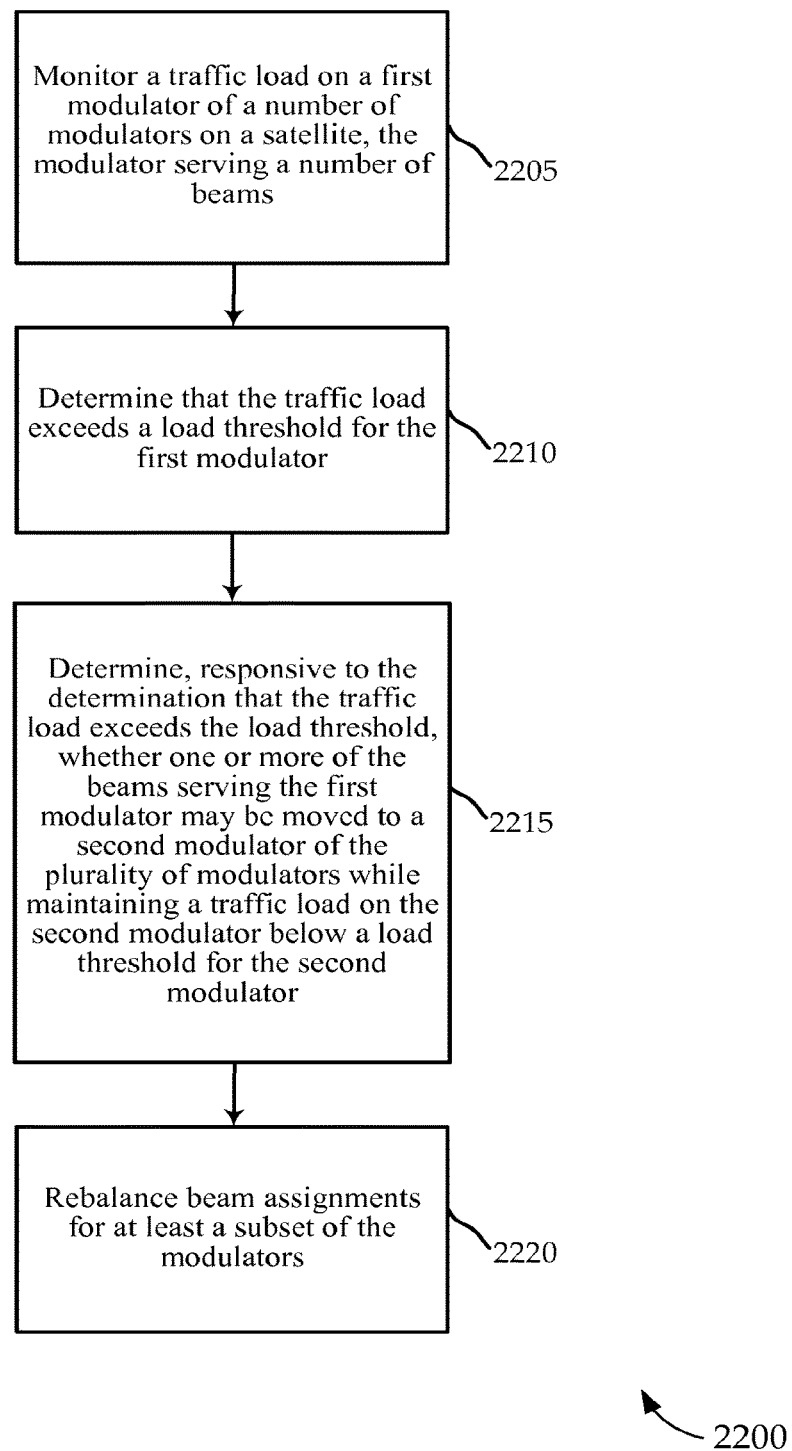
FIG. 22 is a flowchart illustrating a method of modulator rebalancing according to various embodiments of the invention.

FIG. 22 is a flowchart illustrating a method 2200 of modulator rebalancing according to various embodiments of the invention. The method 2200 may, for example, be performed by the DBRA control unit 125 of FIG. 1,4, or 5, the Nee 140 of FIG. 1, or any combination thereof. The method may be performed by the configuration 1800 of FIG. 18, or the system 1900 of FIG. 19.

At block 2205, a traffic load is monitored on a first modulator of a number of modulators on a satellite, the modulator serving a number of beams. At block 2210, a determination is made that the traffic load exceeds a load threshold for the first modulator. At block 2215, a determination is made whether one or more of the beams serving the first modulator may be moved to a second modulator of the plurality of modulators while maintaining a traffic load on the second modulator below a load threshold for the second modulator. This step is performed in response to the determination that the traffic load on the first modulator exceeds the load threshold. At block 2220, beam assignments are rebalanced for at least a subset of the modulators.

Figure 23:
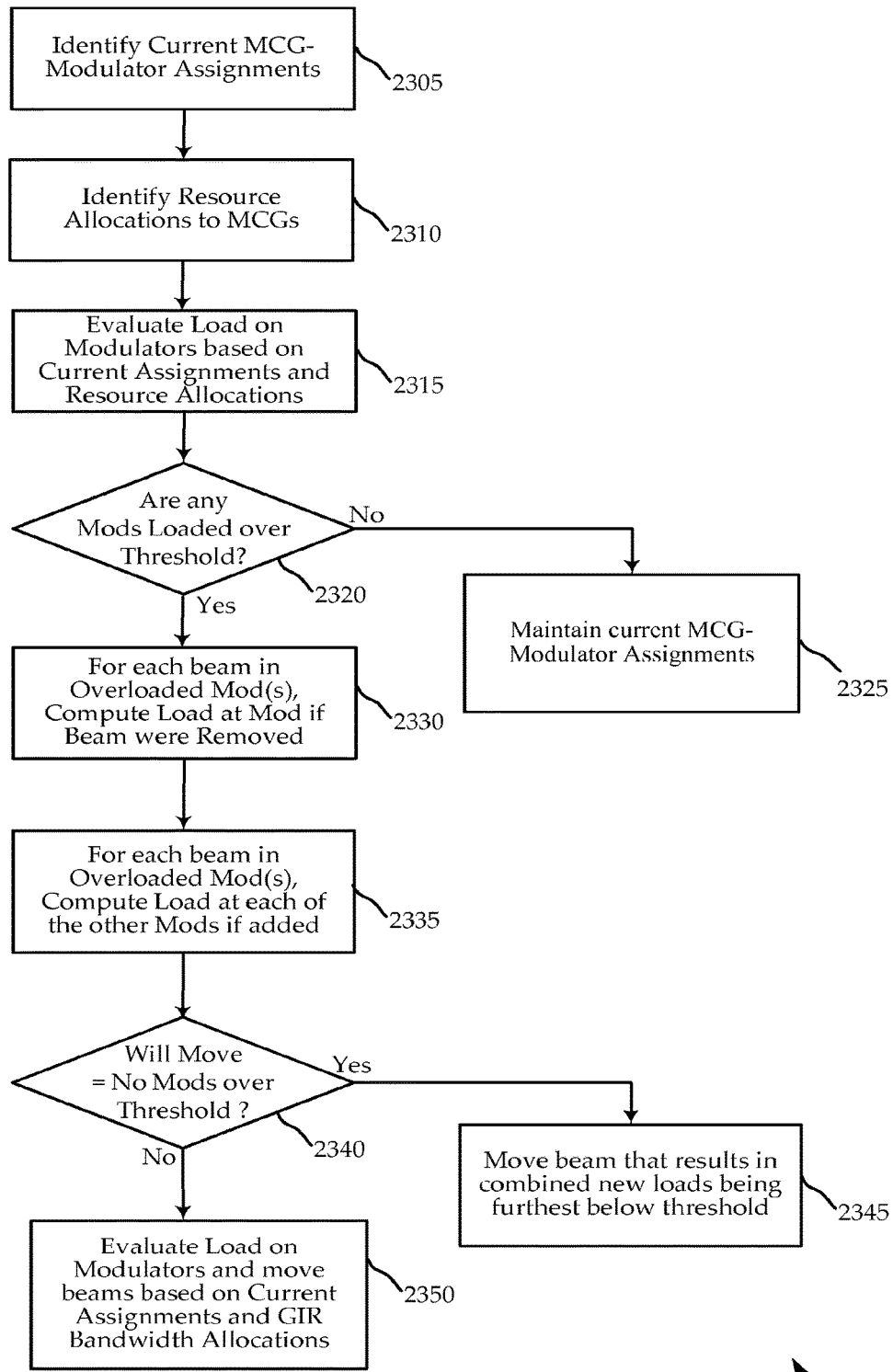
FIG. 23 is a flowchart illustrating a method of modulator assignment and rebalancing over n epochs according to various embodiments of the invention.

FIG. 23 is a flowchart illustrating a method 2300 of modulator assignment and rebalancing over n epochs. The method 2300 may, for example, be performed by the DBRA control unit 125 of FIG. 1,4, or 5, the Nee 140 of FIG. 1, or any combination thereof. The method may be performed by the configuration 1800 of FIG. 18, or the system 1900 of FIG. 19. Moreover, the resource allocation module 215 of FIG. 2, 3,9, or 14 may perform such assignment and rebalancing.

At block 2305, the current MeG-modulator assignments are identified. At block 2310, the resources allocated to each MeG are identified. At block 2315, the load on each modulator (based on current assignments and resource allocations) is evaluated. If a determination at block 2320 indicates that none of the modulators are loaded beyond a selected threshold, the current MCG-modulator assignments may be maintained at block 2325.

If, however, a determination at block 2320 indicates that one or more of the modulators are loaded beyond the selected threshold, a rebalancing may be initiated. At block 2330, for each beam at the overloaded modulator(s), the load at the overloaded modulator is computed to determine the load if the beam was removed. At block 2335, for each beam at the overloaded modulator(s), the load at each non-overloaded modulator is computed to determine the load if the beam was added. At block 2340, a determination is made as to whether movement of one or more beams may result in having no modulators over the selected threshold load. If so, at block 2345, the beam or beams are moved that will result in the new loads at the affected modulators being furthest below the threshold. However, if movement of the beams will not bring all the modulators below the load threshold, the load on the modulators may be reevaluated in light of the GIR allocations at block 2350. Beams may then be reassigned based on the GIR (instead of MIR) calculations. While in the described embodiment, the determination is made on a per-beam basis, the determination may, in other embodiments, be made on a per-MCG basis. Thus, in some cases, MCGs for a beam may be distributed among modulators to achieve rebalancing.

Figure 24:
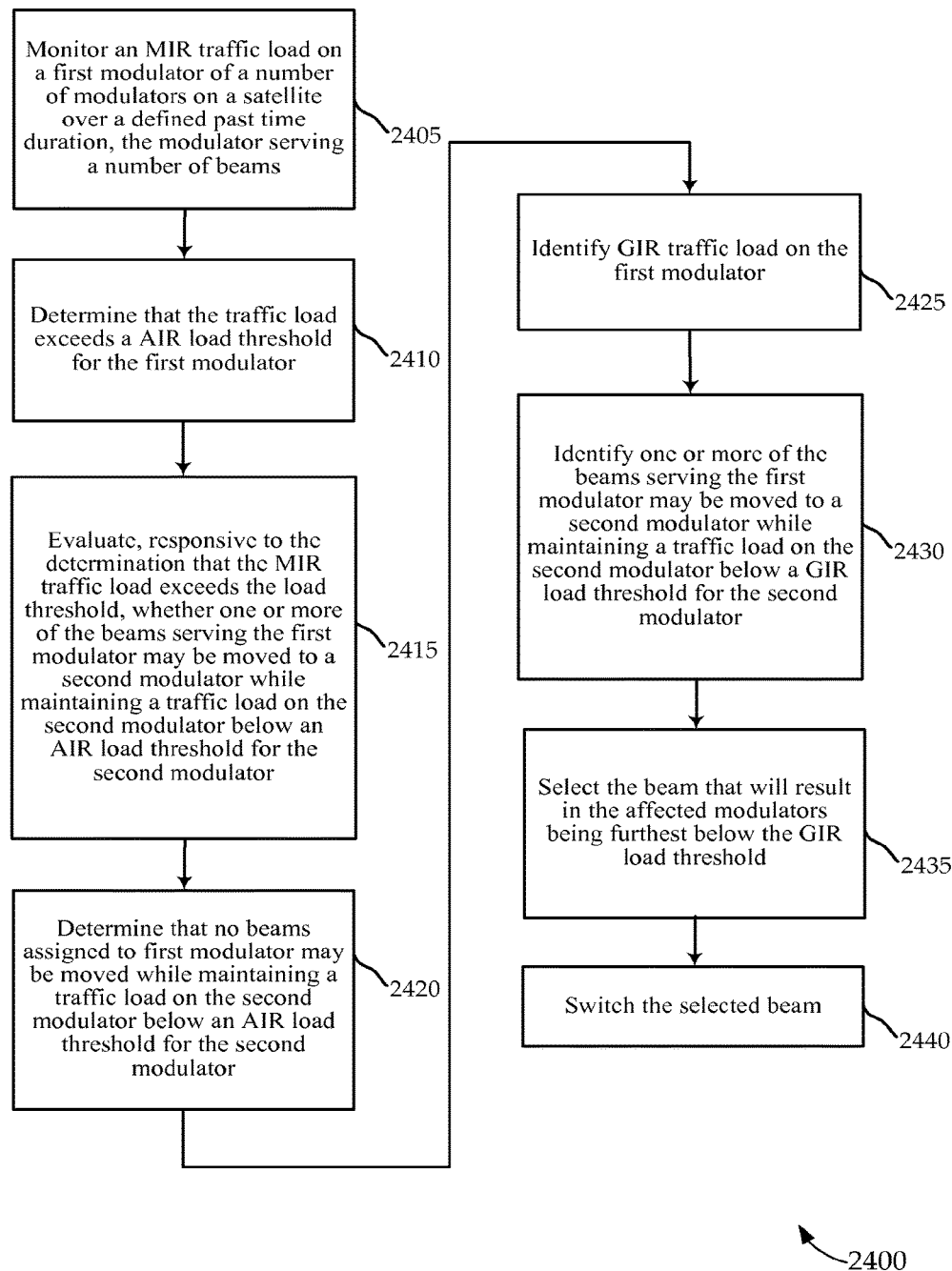
FIG. 24 is a flowchart illustrating an alternative method of modulator rebalancing according to various embodiments of the invention.

FIG. 24 is a flowchart illustrating an alternative method 2400 of modulator rebalancing according to various embodiments of the invention. The method 2400 may, for example, be performed by the DBRA control unit 125 of FIG. 1,4, or 5, the NCC 140 of FIG. 1, or any combination thereof. The method may also be performed by the configuration 1800 of FIG. 18, or the system 1900 of FIG. 19.

At block 2405, an MIR traffic load is monitored on a first modulator of a number of modulators on a satellite over a defined past time duration, the modulator serving a number of beams. At block 2410, a determination is made that this past traffic load exceeds an AIR load threshold for the first modulator for a future time duration. At block 2415, an evaluation is made, responsive to the determination that the MIR traffic load exceeds the load threshold, whether one or more of the beams serving the first modulator may be moved to a second modulator while maintaining a traffic load on the second modulator below an AIR load threshold for the second modulator.

At block 2420, a determination is made that no beams assigned to the first modulator may be moved while maintaining a traffic load on the second modulator below an AIR load threshold for the second modulator. At block 2425, GIR traffic load is identified on the first modulator. At block 2430, one or more of the beams serving the first modulator is identified that may be moved to a second modulator while maintaining a traffic load on the second modulator below a GIR load threshold for the second modulator. At block 2435, the beam that will result in the affected modulators being furthest below the GIR load threshold is selected. At block 2440, the selected beam is switched.

IV. Frequency Channel/Time Slot Assignment to MCGs:

Once all or a portion of the available resource units have been allocated to each MCG, particular ranges of frequencies (referred to above as channels) may be allocated to particular MCGs (or beams). This process may be referred to as frequency channel assignment. Time slots may also be assigned to MCGs in a coordinated process. In some embodiments, the modulator assignments to each MCG (or to beams) are made in advance of the frequency channel and time slot assignments. The downlink frequency and time slots may be assigned to particular beams or MCGs every n epochs, although in some embodiments, the frequency and time slot assignments may be made less often than the bandwidth allocation (e.g., every epoch or every frame). The timing for the frequency channel and time slot assignments may vary. For example, when resource allocation is more stable, the frequency and time slot assignment intervals could be lengthened or the process suspended until there is a change in resource allocation that exceeds a threshold.

In some embodiments, there are two 320 MHz channels and four 160 MHz channels to be allocated to MCGs or beams (e.g., over a frame or epoch). In one embodiment, the channels are allocated to MCGs or beams using a 3-color reuse pattern constraint; in another embodiment, the channels are allocated to beams using a 4-color reuse pattern constraint. In still other embodiments, there may be more or fewer channels, and other reuse patterns. Regardless, the frequencies and time slots may be assigned dynamically in response to the resources allocated to each beam or MCG. Many of the following examples assume smaller numbers of channels, beams, and modulators. It is worth noting, however, that the examples are used to illustrate aspects of the invention, and should not be interpreted as limiting the number of channels, beams, or modulators.

Figure 25:
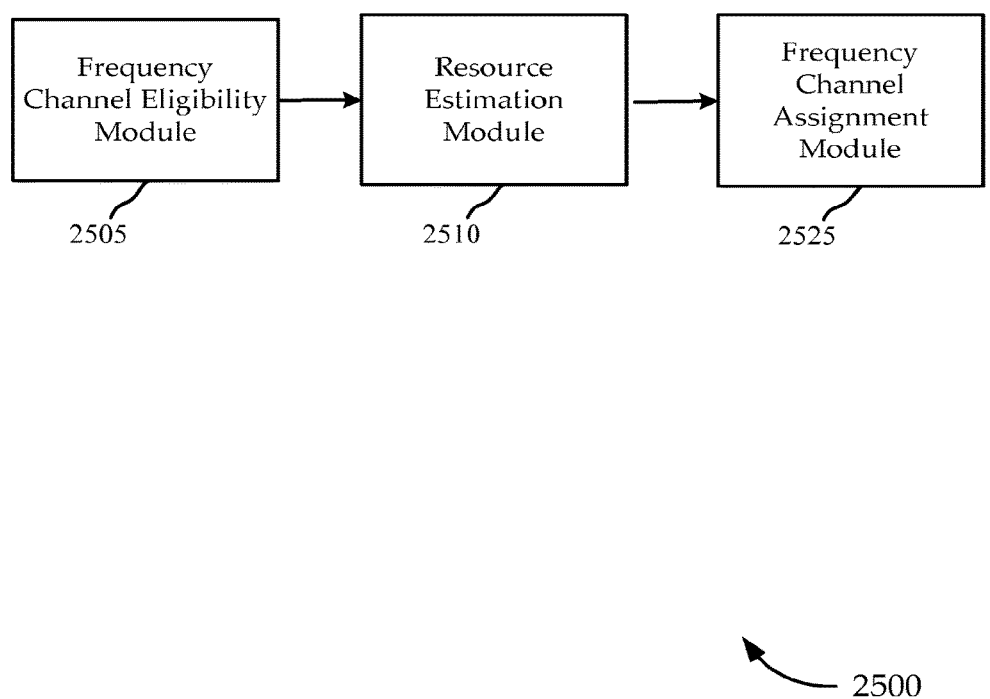
FIG. 25 is a block diagram illustrating a configuration for frequency channel assignment according to various embodiments of the invention.

Turning to FIG. 25, a block diagram illustrates an example configuration 2500 to implement the modulator assignment and balancing process. This configuration 2500 may be implemented in the system 100 of FIG. 1 or, more specifically, in the NCC 140 of FIG. 1, the DBRA control unit 125 of FIG. 1,4, or 5, or any combination thereof. The configuration 2500 may be implemented in the resource allocation module 215 of FIG. 2, 3, 9, or 14, as well. However, some or all of the functionality of the modules may be implemented in other devices or sets of devices.

The configuration 2500 includes a frequency channel eligibility module 2505, a resource estimation module 2510, and a frequency channel assignment module 2515, which may each be in communication with each other. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The frequency channel eligibility module 2505 may be configured to identify and monitor the number of eligible downlink frequency channels for each of a number of MCGs. The eligibility may be based on frequency channel reuse constraints, and on whether certain frequency channel sizes support underlying modulation and coding formats. The resource estimation module 2510 may estimate downlink resource unit demand for each of MCGs. This may be based on a cumulative guaranteed downlink rate for each MCG, and/or a measured information for a past time period.

The frequency channel assignment module 2515 may select a particular MCG from the group of MCGs for frequency channel assignment. The selection may be undertaken in an order corresponding to the number of eligible downlink frequency channels and the estimated downlink resource unit demand for the MCGs. The frequency channel assignment module 2515 may then assign a frequency channel and time slot to each selected MCG.

Figure 26:
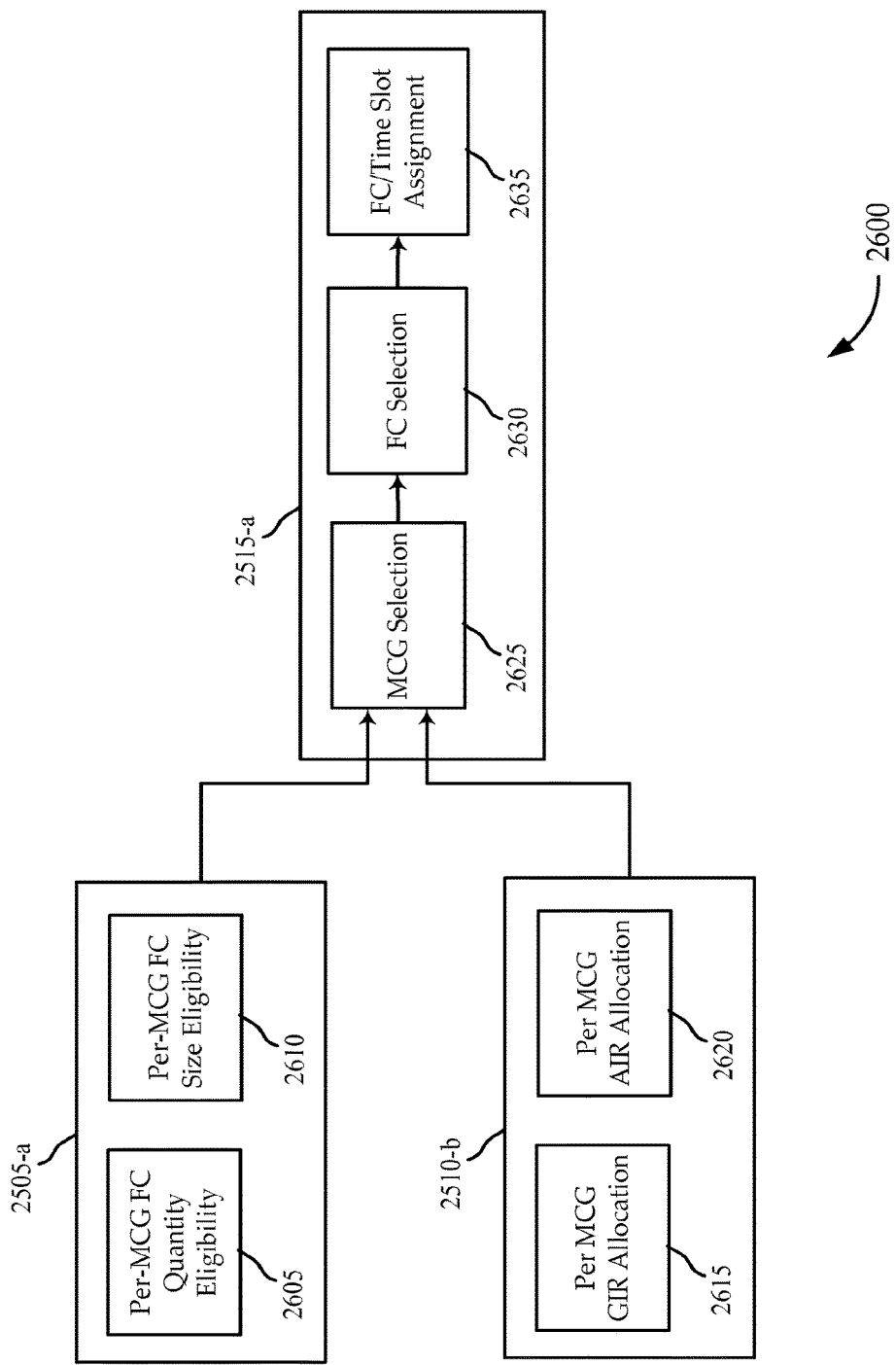
FIG. 26 is a block diagram illustrating an example system for frequency channel and time slot assignment according to various embodiments of the invention.

Referring to FIG. 26, a block diagram illustrates an example system 2600 to implement the frequency channel and time slot assignment process. This system 2600 may be implemented in the system 100 of FIG. 1 or, more specifically, in the NCC 140 of FIG. 1, the DBRA control unit 125 of FIG. 1,4, or 5, or any combination thereof. The system 2600 may be implemented in the resource allocation module 215 of FIG. 2, 3, 9, or 14, as well. The system 2600 may be the configuration 2500 of FIG. 25. However, some or all of the functionality of the modules may be implemented in other devices or sets of devices.

The system 2600 again includes a frequency channel eligibility module 2505-a, a resource estimation module 2510-a, and a frequency channel assignment module 2515-a, which may each be in communication with each other. The frequency channel eligibility module 2505-a includes a per-MCG frequency channel quantity eligibility module 2605, and a per-MCG frequency channel size eligibility module 2610. The resource estimation module 2510-a includes a per-MCG GIR allocation module 2615 and a per-MCG AIR allocation module 2620. The frequency channel assignment module 2515-a includes an MCG selection module 2625, a frequency channel selection module 2630, and a frequency channel time slot assignment module 2635. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The frequency channel eligibility module 2505 may be configured to identify and monitor the number of eligible downlink frequency channels for each of a number of MCGs. More specifically, the per-MCG frequency channel quantity eligibility module 2605 may determine, for each MCG, the quantity of eligible downlink frequency channels. The per MCG frequency channel size eligibility module 2610 may determine, for each MCG, the number of different eligible downlink frequency channel sizes. The eligibility may be based on frequency channel reuse constraints, and on whether certain frequency channel sizes support underlying modulation and coding formats.

The resource estimation module 2510 may monitor, estimate, and update downlink resource unit demand for each of the MCGs. More specifically, the per-MCG GIR allocation module 2615 may estimate downlink resource unit demand by identifying a cumulative guaranteed downlink rate for each of the MCGs. The per-MCG AIR allocation module 2620 may estimate downlink resource unit demand by identifying a measured downlink traffic rate in excess of the cumulative guaranteed downlink rate for each of the MCGs for a past defined time period. In one embodiment, the overall demand may be estimated by measuring a downlink traffic load for each of the MCGs for a past defined time period.

The frequency channel assignment module 2515 may select a particular MCG from the group of MCGs for frequency channel assignment. The selection may be undertaken in an order corresponding to the number and size options of eligible downlink frequency channels (e.g., favoring the MCGs that have fewer total frequency channels and/or size options available). The selection may also or alternatively be undertaken in an order corresponding to the estimated downlink resource unit demand for the MCGs.

In one example, the MCG selection module 2625 selects a set of MCGs that have a guaranteed downlink rate allocation remaining to be assigned. The MCG selection module 2625 selects an MCG from that group that has the fewest number and/or size options of eligible downlink frequency channels. The MCG selection module 2625 continues this selection process until all of the guaranteed downlink rate allocation is assigned. The MCG selection module 2625 may then continue the selection process for the measured downlink traffic rate in excess of the cumulative guaranteed downlink rate for each of the MCGs.

With each MCG selected, the frequency channel selection module 2630 may identify one or more frequency channels for each selected MCG, and the frequency channel time slot assignment module 2635 may assign time slots time slots within the selected frequency channel to the MCG. In one example, the cumulative guaranteed downlink rate for each selected MCG is assigned frequency channel time slots. After the assignment for the cumulative guaranteed downlink rate is performed, the assignment of frequency channel timeslots for MCGs is undertaken to fulfill the measured downlink traffic rate in excess of the cumulative guaranteed downlink rate.

For each selected MCG, frequency channel selection module 2630 may identify the frequency channel for assignment by identifying an eligible frequency channel with a largest time allocation remaining among eligible frequency channels. Also or alternatively, the frequency channel selection module 2630 may identify the frequency channel for assignment by identifying an eligible frequency channel with fewer modulation and coding group assignments than other eligible frequency channels.

Figure 27:
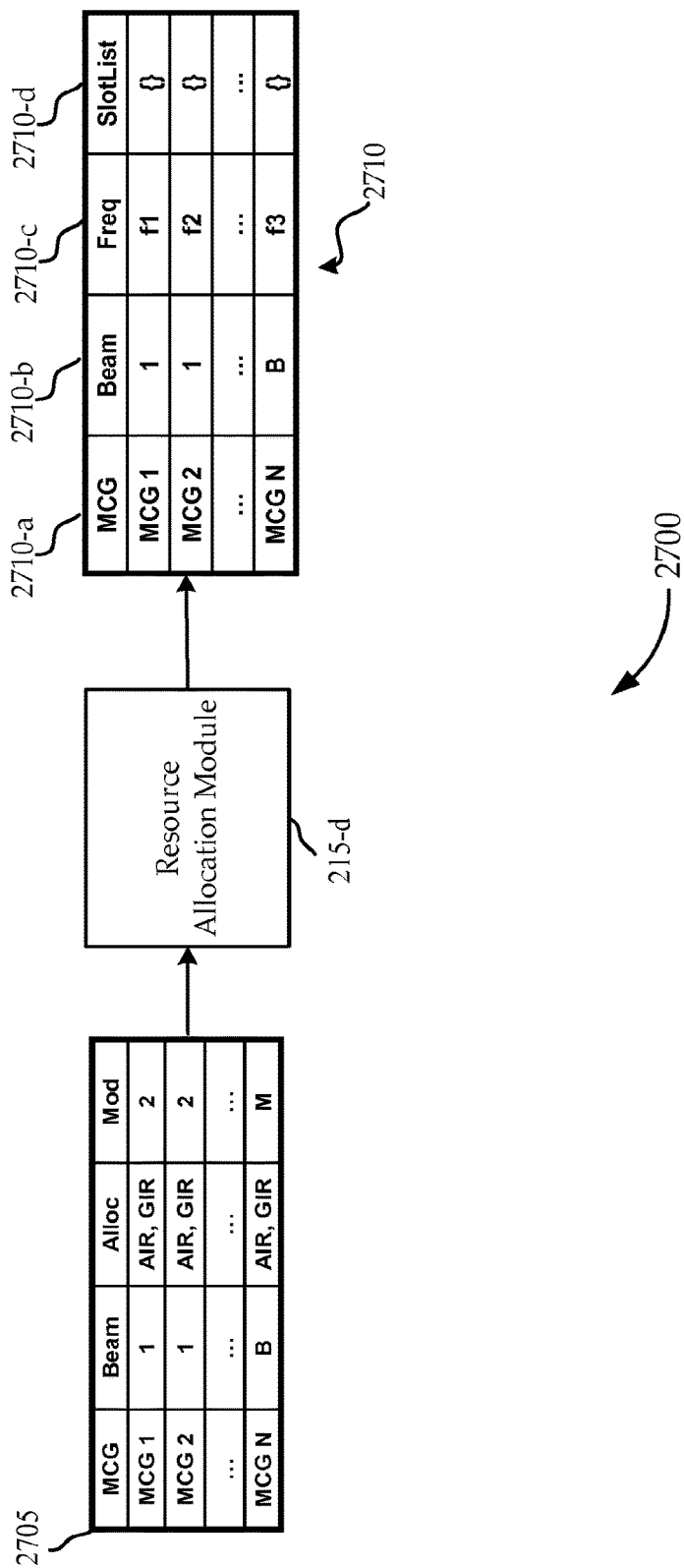
FIG. 27 is a block diagram illustrating an example process for assigning frequency channels and time slots to beams or MCGs according to various embodiments of the invention.

Turning to FIG. 27, a block diagram 2700 illustrates an example process for assigning frequency channels and time slots to beams or MCGs. This process may be initiated by identifying the resource allocation for a set of MCGs over n epochs, as set forth in FIG. 20 (note that a per-beam resource allocation may be used as well, but MCG allocation will be used in this example). Information on modulator assignment to MCGs may also be used as an input. A table 270S (which may be table 2000 of FIG. 20) illustrating an example of such a resource allocation and modulator assignment is shown in FIG. 27.

The resource allocation module 21S-d (which may be the resource allocation module 21S of FIG. 2, 3, 9, or 14) may receive the allocation and modulator assignment table S 270S. The resource allocation module 21S-d may then initiate the process, assigning the GIR allocations first, and then the remaining AIR. A first MCG may be selected, and the whole GIR for the selected MCG may be assigned to a frequency channel and series of time slots. This process may be repeated for each of the MCGs for their respective GIR allocations. Once the GIR allocations have been assigned, the remaining AIR for each of the MCGs may be assigned time slots. The resource allocation module 21S-d may determine the order of GIR allocations by looking at a number of factors, including: the frequency channels available for assignment to an MCG, and the GIR that is left to be allocated at each MCG. When there is more than one frequency channel, each of the available frequency channels may be evaluated for the best time slot fit. Time slots may be identified to ensure that a IS modulator is not serving different MCGs during the same time period.

Upon frequency and time slot assignment, the resource allocation module 21S-d may output a table 2710 which includes the assignments. This table 2710 includes a column identifying the MCG 2710-a for each respective row, the assigned beam 2710-b, the assigned frequency 2710-c for the MCG, and the time slot assignment 2710-d for the respective MCG.

Figure 28:
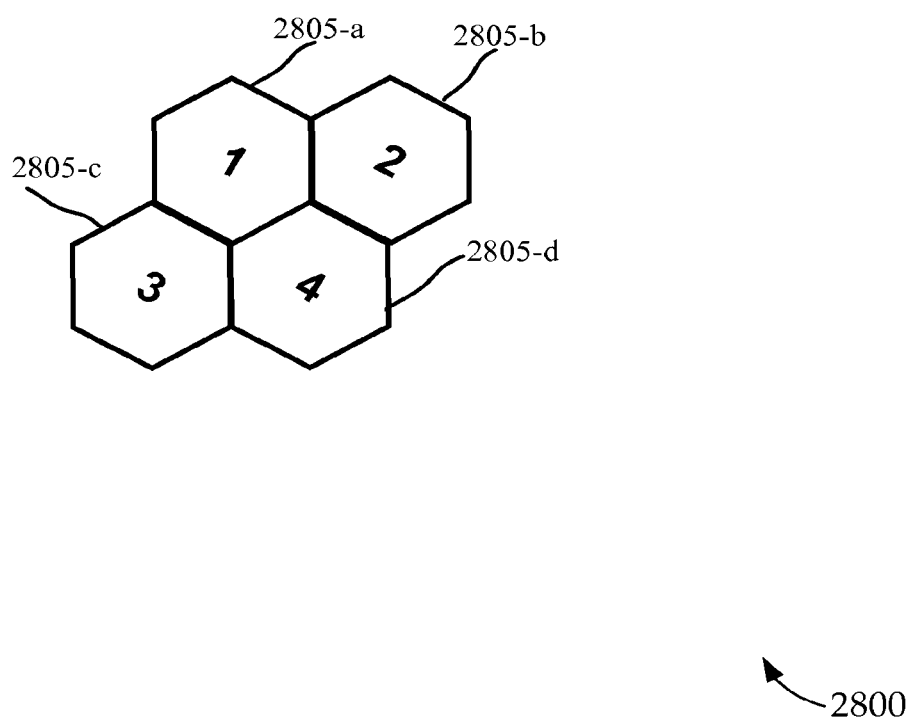
FIG. 28 illustrates an example beam layout for a four-beam system according to various embodiments of the invention.
Figure 29:
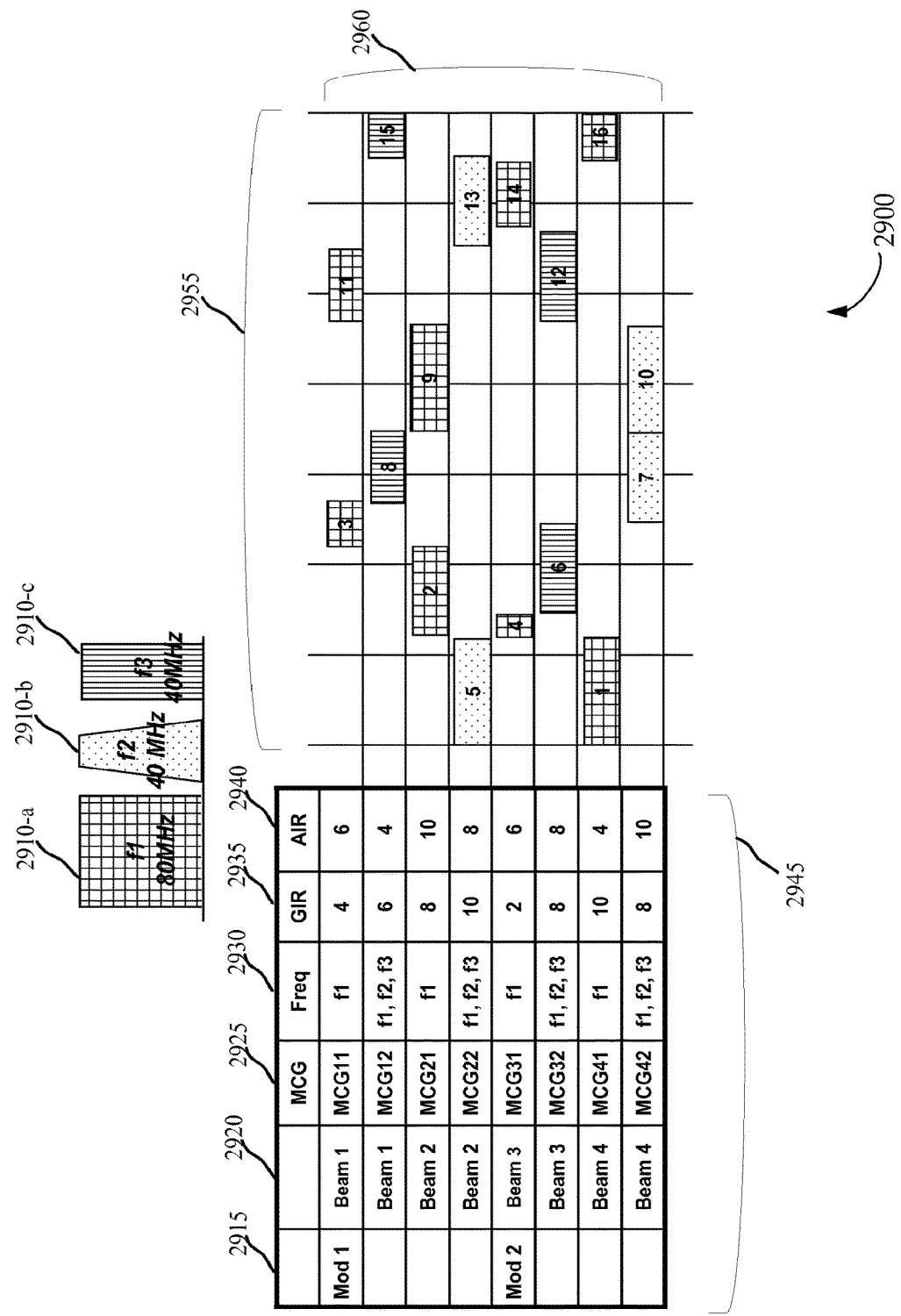
FIG. 29 is a block diagram illustrating certain parameters of an example satellite communications system that may be used with the example beam layout according to various embodiments of the invention.

An example of such a frequency channel and time slot assignment will now be disclosed using FIGS. 28 and 29. The assignment process may, for example, be performed by the DBRA control unit 12S of FIG. 1,4, or S, the NCC 140 of FIG. 1, or any combination thereof. The method may also be performed by the configuration 2S00 of FIG. 2S, or the system 2600 of FIG. 26. FIG. 28 illustrates an example beam layout 2800 for a four beam 2S system. Beam 1 280S-a is adjacent to beam 2 280S-b, beam 3 280S-c, and beam 4 280S-d; beam 4 is similarly adjacent to the other 3 beams. Beam 2 280S-b is adjacent to beam 1 280S-a and beam 4 280S-d, and not beam 3 280S-c. Beam 3 280S-c is adjacent to beam 1 280S-a and beam 4 280S-d, and not beam 2 280S-b.

FIG. 29 illustrates certain parameters 2900 of an example satellite communications system that may be used with the layout 2800 of FIG. 28. The following assignment progression illustrates how aspects described above may be implemented in a simplified system, and are for purposes of example only. The parameters specify a three-color system, with a first frequency 2910-a (f1, 80 MHz), a second frequency 2910-b (f2, 40 MHz), and a third frequency 2910-c (f3, 40 MHz).

FIG. 29 also illustrates a table 2945, including a row for each MCG 2925. The table 2945 specifies the modulator 2915 and beam 2920 assignments for each MCG. The table 2945 specifies the frequency channels 2930 allowed for assignment for each MCG. The GIR 2935 allocation and the AIR 2940 allocation (in excess of the GIR) are listed for each MCG. A time slot and frequency diagram shows how frequencies and time slots may be selected; time is illustrated across the x-axis 2955 (earlier is to the left, later is to the right), while y-axis 2960 corresponds the time slot assignment to each respective MCG. The fill pattern of each time slot indicates the frequency selected, and the number indicates the order of assignment.

Turning now to an overview of the frequency and time slot assignment process (while noting that this is for purposes of example only), the GIR allocations will be addressed first. MCG41 receives the first frequency and time slot assignment, because 1) it is limited to f1, 2) it has the most GIR to allocate of the four MCGs limited to f1. MCG41 is assigned f1, and given the earliest time slot. MCG21 receives the next frequency and time slot assignment, because 1) it is limited to f1, 2) it has the most GIR to allocate of the three remaining MCGs limited to f1. MCG21 is assigned f1, and given the earliest time slot after MCG41 (because MCG21 and MCG41 use f1 and are in adjacent beams, time slots cannot overlap). MCG11 receives the next frequency and time slot assignment, because 1) it is limited to f1, 2) it has the most GIR to allocate of the two remaining MCGs limited to f1. MCG 11 is assigned f1, and given the earliest time slot after MCG21 (because MCG 11, MCG21, and MCG41 use f1 and are in adjacent beams, time slots cannot overlap). MCG31 receives the next frequency and time slot assignment, because 1) it is limited to f1. MCG31 is assigned f1, and given the earliest time slot after MCG 11 (because MCG 11 and MCG31 use f1 and are in adjacent beams, time slots cannot overlap; however, MCG31 and MCG21 can overlap timewise because their beams are not adjacent).

The remaining MCGs may use any of the frequencies; MCG22 receives the next frequency and time slot assignment, because 1) it has the most GIR to allocate of the four remaining MCGs. MCG22 is assigned f2, and given the earliest time slot for f2. MCG32 receives the next frequency and time slot assignment, because 1) it has the most GIR (tied) to allocate of the three remaining MCGs. MCG32 is assigned f3, the first MCG to be assigned f3. However, MCG32 uses modulator 2, and thus its time slot allocation goes after the MCG41 and MCG31 assignments which also use modulator 2. MCG42 receives the next frequency and time slot assignment, because 1) it has the most GIR to allocate of the two remaining MCGs. MCG42 is assigned f1. However, MCG42 uses modulator 2, and thus its time slot allocation must go after the MCG41, MCG31, and MCG32 assignments which also use modulator 2. MCG12 receives the next frequency and time slot assignment, because 1) it has GIR to allocate. MCG12 is assigned f1. However, MCG12 uses modulator 1, and thus its time slot allocation must go after the MCG22, MCG21, and MCG12 assignments which also use modulator 1.

Since the GIR for the MCGs has been assigned frequencies and time slots, the AIR in excess of the GIR is then assigned. The assignment progression proceeds in an order with a weighting toward those MCGs with 1) the most AIR to be assigned, and 2) the most wanted frequencies (e.g., f1). The illustrated progression provides but one example, as other assignment progressions for the excess AIR may be used, as well.

Figure 30:
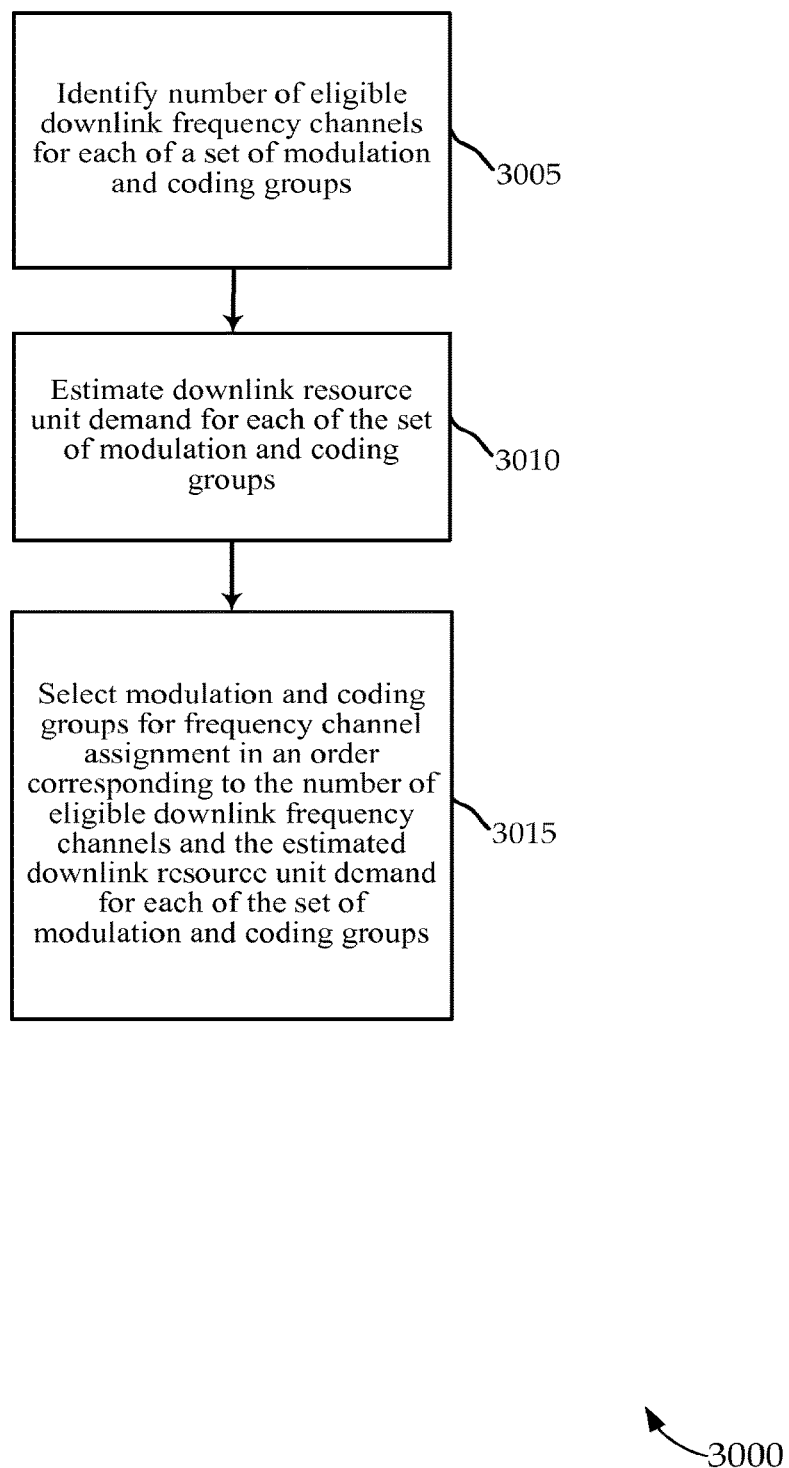
FIG. 30 is a flowchart illustrating a method for frequency channel assignment according to various embodiments of the invention.

FIG. 30 is a flowchart illustrating a method 3000 of selecting modulation and coding groups for frequency channel assignment according to various embodiments of the invention. The method 3000 may, for example, be performed by the DBRA control unit 125 of FIG. 1,4, or 5, the NCC 140 of FIG. 1, or any combination thereof. The method may also be performed by the configuration 2500 of FIG. 25, or the system 2600 of FIG. 26.

At block 3005, the number of eligible downlink frequency channels is identified for each of a set of MCGs. At block 3010, downlink resource unit demand is estimated for each of the set of MCGs. At block 3015, modulation and coding groups are selected for frequency channel assignment in an order corresponding to the number of eligible downlink frequency channels and the estimated downlink resource unit demand for each of the set of MCGs.

Figure 31:
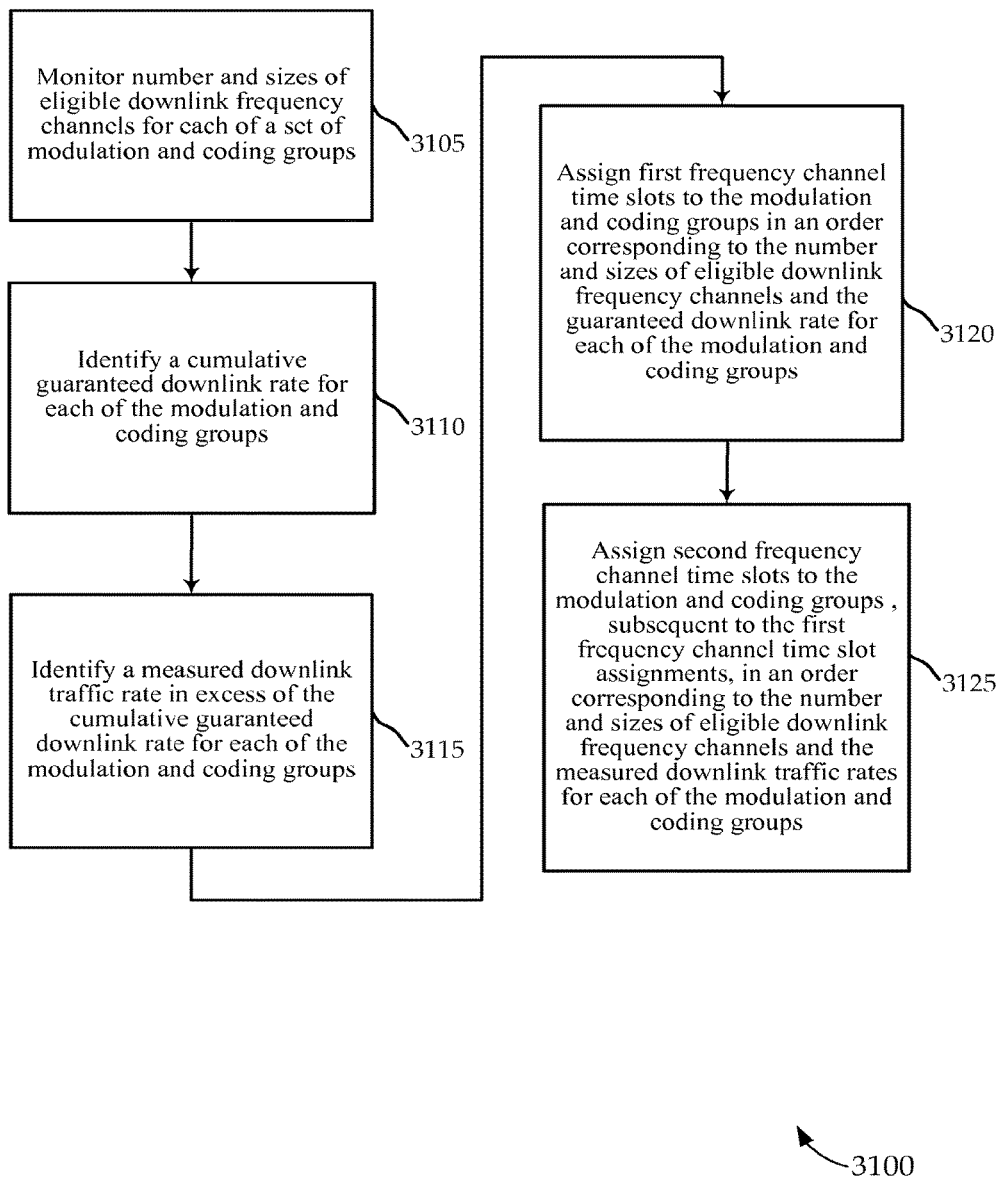
FIG. 31 is a flowchart illustrating a method of selecting modulation and coding groups for frequency channel assignment according to various embodiments of the invention.

FIG. 31 is a flowchart illustrating a method 3100 of modulation and coding group frequency channel assignment according to various embodiments of the invention. The method 3100 may, for example, be performed by the DBRA control unit 125 of FIG. 1,4, or 5, the NCC 140 of FIG. 1, or any combination thereof. The method 3100 may also be performed by the configuration 2500 of FIG. 25, or the system 2600 of FIG. 26.

At block 3105, the number and sizes of eligible downlink frequency channels are monitored for each of a set of MCGs. At block 3110, a cumulative guaranteed downlink rate is identified for each of the MCGs. At block 3115, a measured downlink traffic rate in excess of the cumulative guaranteed downlink rate is identified for each of the MCGs. At block 3120, first frequency channel time slots are assigned to the MCGs in an order corresponding to the number and sizes of eligible downlink frequency channels and the guaranteed downlink: rate for each of the MCGs. At block 3125, second frequency channel time slots are assigned to the MCGs, subsequent to the first frequency channel time slot assignments, the assignments made in an order corresponding to the number and sizes of eligible downlink: frequency channels and the measured downlink: traffic rates for each of the MCGs.

Figure 32:
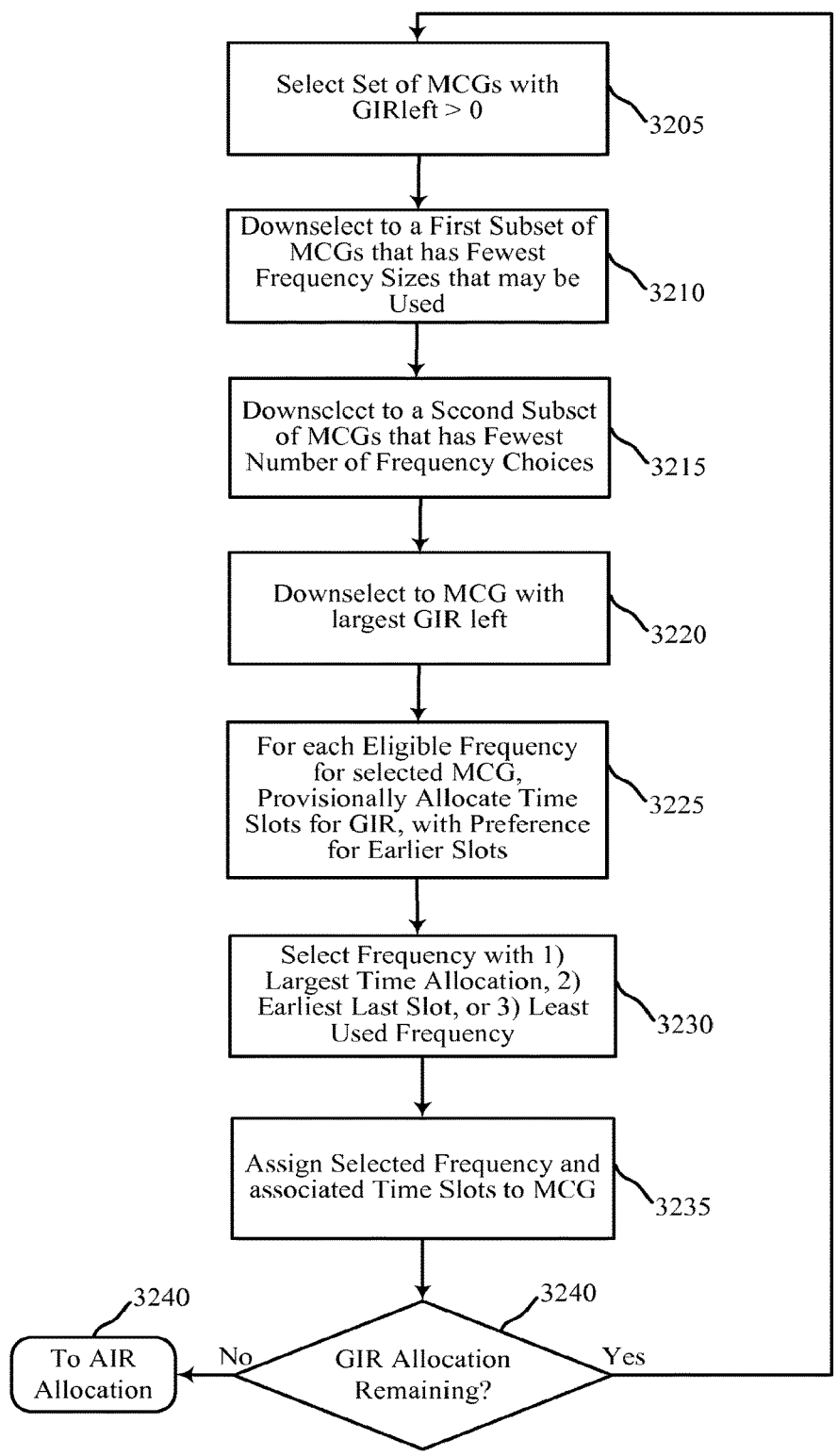
FIG. 32 is a flowchart illustrating a method of frequency channel and time slot assignment according to various embodiments of the invention.

FIG. 32 is a flowchart illustrating a method 3200 of frequency channel and time slot assignment according to various embodiments of the invention. The method 3200 may, for example, be performed by the DBRA control unit 125 of FIG. 1,4, or 5, the NCC 140 of FIG. 1, or any combination thereof. The method 3200 may also be performed by the configuration 2500 of FIG. 25, or the system 2600 of FIG. 26.

At block 3205, among the MCGs of a system, the set is selected that still has a GIR allocation without a frequency channel and time slot assignment for a given period (e.g., a frame, or epoch). At block 3210, from the selected subset, a first subset may be selected that has the fewest frequency sizes that may be used (e.g., in a system with 320 MHz and 160 MHz bands, MCGs that can select only the 320 MHz channel size (but not the 160 MHz channel) may be selected for the first subset). At block 3215, from the first subset, a second subset may be selected that has the fewest number of choices (e.g., in a system with multiple 320 MHz and 160 MHz bands, MCGs that can use only one of the 320 MHz channels (e.g., because none of the other channels are available to the MCG because of CCI or other constraints) may be selected for the second subset). At block 3220, from the second subset, the MCG may be selected that has the largest GIR left.

At block 3225, for each eligible frequency for the selected MCG, time slots may be provisionally allocated for the complete GIR allocation, with a preference for earlier slots. Thus, each available frequency channel may be compared to determine which has the best time slot fit. At block 3230, for the selected MCG, the frequency channel which has the 1) largest time allocation, 2) earliest last placed slot, or 3) is the least used frequency, may be selected. At block 3235, the selected frequency and associated time slots are assigned to the MCG. At block 3240, a determination is made whether other MCGs have allocated GIR but are lacking frequency channel and time slot assignments. If so, aspects of the method 3200 return to block 3205 to repeat for additional frequency and time slot assignments for the remaining MCGs with GIR according to blocks 3205-3240.

However, if at block 3240, a determination is made that no other MCGs have remaining GIR allocation, the AIR in excess of the GIR (e.g., the measured rate above the GIR) may be assigned time slots. There are a number of different embodiments which may be used in the AIR frequency and time slot assignment:

1) In one embodiment, a round robin assignment may occur across MCGs, one time slot at a time. For each MCG, the first (earliest) valid time slot may be assigned. If there are multiple frequency choices, the best choice may be made based on any number of factors (e.g., the earliest time slot, or the least used frequency); or
2) In one embodiment, MCGs with the fewest frequency choices left are identified. For each such MCG, the least used frequency may be selected. Once all of these MCGs have been assigned frequencies, the iteration may continue with MCGs that have a next fewest frequency choice left, and so on. In these and other embodiments, time slots for each MCG may be assigned with preference given to those MCGs with the most AIR left for assignment.

Figure 33:
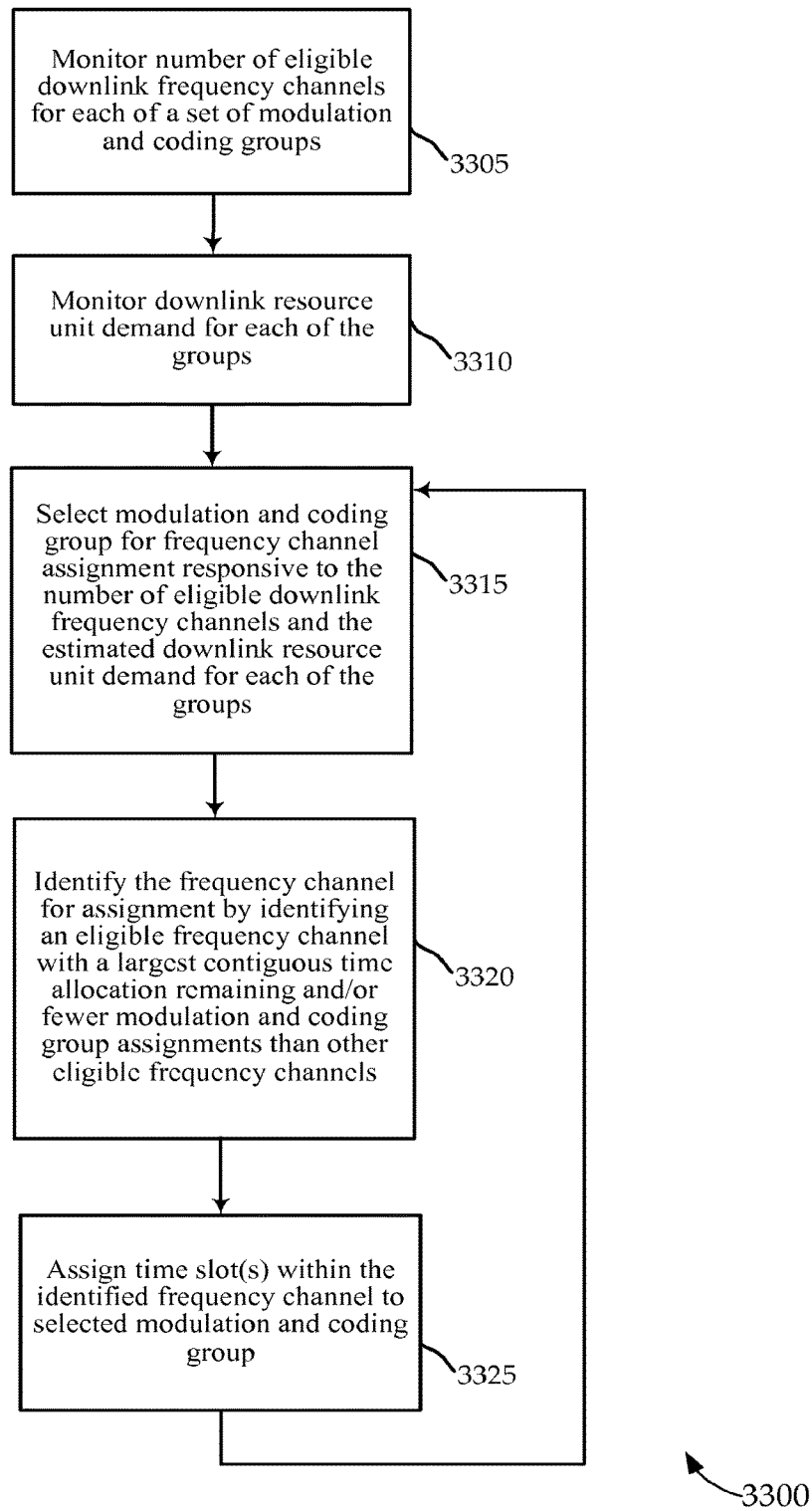
FIG. 33 is a flowchart illustrating a method of frequency channel assignment for modulation and coding groups according to various embodiments of the invention.

FIG. 33 is a flowchart illustrating a method 3300 of modulation and coding group frequency channel assignment according to various embodiments of the invention. The method 3300 may, for example, be performed by the DBRA control unit 125 of FIG. 1,4, or 5, the NCC 140 of FIG. 1, or any combination thereof. The method 3300 may also be performed by the configuration 2500 of FIG. 25, or the system 2600 of FIG. 26.

At block 3305, the number of eligible downlink frequency channels is monitored for each of a set of MCGs. At block 3310, downlink resource unit demand is monitored for each of the MCGs. At block 3315, MCGs are selected for frequency channel assignment responsive to the number of eligible downlink frequency channels and the estimated downlink resource unit demand for each of the MCGs. At block 3320, the frequency channel for assignment is identified by identifying an eligible frequency channel with a largest contiguous time allocation remaining and/or fewer MCG assignments than other eligible frequency channels. At block 3325, time slot(s) are assigned within the identified frequency channel to a selected MCG.

Any of the functionality described above with reference to the satellite 105, terminals 130, or NCC 140 of FIG. 1, or components thereof (e.g., resource manager 215, modem unit 115, or DBRA control unit 125), may be implemented in one or more Application Specific Integrated Circuits (ASICs), or in one or more general purpose processors adapted to perform the applicable functions. Alternatively, the functions of a satellite 105 may be performed by one or more other processing units (or cores) on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for modulator balancing in a multi-beam satellite communications network, the method comprising:
   monitoring a traffic load on a first modulator of a plurality of modulators on a satellite, the first modulator serving a plurality of beams of the satellite;
   determining that the traffic load exceeds a load threshold for the first modulator;
   identifying, responsive to the determination that the traffic load exceeds the load threshold, one or more of the plurality of beams served by the first modulator that may be moved to a second modulator of the plurality of modulators while maintaining a traffic load on the second modulator below a load threshold for the second modulator; and
   selecting a beam of the one or more of the plurality of beams to be moved to the second modulator.

2. The method of claim 1, wherein the selecting comprises:
   selecting the beam and the second modulator responsive to a determination that a combined traffic load metric on the first modulator and the second modulator after moving the selected beam to the second modulator is lower than a combined traffic load metric from moving one or more of the plurality of beams to one or more other modulators of the plurality of modulators.

3. The method of claim 1, wherein the selecting comprises:
   selecting the beam and the second modulator responsive to a determination that a combined traffic load metric on the first modulator and the second modulator after moving the selected beam to the second modulator is lower than a combined traffic load metric from moving the selected beam to one or more other modulators of the plurality of modulators.

4. The method of claim 1, wherein the selecting comprises:
   selecting the beam and the second modulator responsive to a determination that a combined traffic load metric on the first modulator and the second modulator after moving the selected beam to the second modulator is lower than a combined traffic load metric from moving other of the plurality of beams to the second modulator.

5. The method of claim 1, wherein the identifying further comprises:
identifying one or more of a second plurality of beams served by the second modulator that may be moved to the first modulator to maintain the traffic load on the second modulator below the load threshold for the second modulator.

6. The method of claim 5, wherein the selected beam of the one or more of the second plurality of beams served by the second modulator is switched to the first modulator concurrently with the selected beam of the plurality of beams served by the first modulator being switched to the second modulator.

7. The method of claim 1, wherein,
the first modulator outputs a waveform for only one carrier at any given time period; and
the second modulator outputs a waveform for only one carrier at any given time period.

8. The method of claim 1, wherein the method is performed by the satellite for rebalancing downlink resources.

9. The method of claim 1, wherein the method is performed by a ground-based network control center for rebalancing downlink resources.

10. The method of claim 1, wherein the identifying one or more of the plurality of beams served by the first modulator that may be moved to the second modulator of the plurality of modulators while maintaining the traffic load on the second modulator below the load threshold for the second modulator comprises:
determining that none of the plurality of beams served by the first modulator may be moved to the second modulator while maintaining a measured traffic load on the second modulator below the load threshold for the second modulator; and
identifying that the one or more of the plurality of beams served by the first modulator may be moved to the second modulator while maintaining a committed information rate on the second modulator below the load threshold for the second modulator.

11. A system for modulator balancing in a multi-beam satellite communications network, comprising:
means for monitoring a traffic load on a first modulator of a plurality of modulators on a satellite, the first modulator serving a plurality of beams of the satellite; and
means for determining that the traffic load exceeds a load threshold for the first modulator;
means for determining whether one or more of the plurality of beams served by the first modulator may be moved to a second modulator of the plurality of modulators while maintaining a traffic load on the second modulator below a load threshold for the second modulator; and
means for selecting a beam of the one or more of the plurality of beams to be assigned to the second modulator.

12. The system of claim 11, wherein the means for determining whether the one or more of the plurality of beams served by the first modulator may be moved to the second modulator identifies the beam and the second modulator responsive to a determination that a combined traffic load metric on the first modulator and the second modulator after moving the selected beam to the second modulator is lower than a combined traffic load metric from moving one or more of the plurality of beams to one or more other modulators of the plurality of modulators.

13. The system of claim 11, wherein the means for determining whether the one or more of the plurality of beams served by the first modulator may be moved to the second modulator identifies the beam and the second modulator responsive to a determination that a combined traffic load metric on the first modulator and the second modulator after moving the selected beam to the second modulator is lower than a combined traffic load metric from moving other of the plurality of beams to the second modulator.

14. The system of claim 11, wherein the means for selecting selects one or more of a second plurality of beams served by the second modulator to be moved to the first modulator to maintain the traffic load on the second modulator below the load threshold for the second modulator.

15. The system of claim 14, further comprising means for concurrently switching the selected beam of the one or more of the second plurality of beams served by the second modulator to the first modulator and the selected beam of the one or more of the plurality of beams served by the first modulator to the second modulator.

16. The system of claim 11, wherein the system comprises the satellite, a ground-based network control center, or a combination thereof.

17. A method for modulator balancing in a multi-beam satellite communications network, the method comprising:
monitoring a traffic load on a first modulator of a plurality of modulators on a satellite, the first modulator serving a plurality of beams of the satellite;
determining that the traffic load exceeds a load threshold for the first modulator;
determining, responsive to the determination that the traffic load exceeds the load threshold, whether one or more modulation and coding groups of a beam of the plurality of beams served by the first modulator may be reassigned to a second modulator of the plurality of modulators while maintaining a traffic load on the second modulator below a load threshold for the second modulator; and
rebalancing beam assignments for at least a subset of the plurality of modulators, wherein the rebalancing comprises assigning the one or more modulation and coding groups of the beam of the plurality of beams served by the first modulator to the second modulator.

18. The method of claim 17, further comprising:
measuring data traffic on each of the plurality of beams served by the first modulator over a past time duration, wherein the traffic load comprises the measured data traffic for each of the plurality of beams.

19. The method of claim 17, further comprising:
aggregating a committed information rate for data traffic on each of the plurality of beams served by the first modulator, wherein the traffic load comprises the aggregated committed information rate for the plurality of beams.

20. The method of claim 17, wherein,
the determining that the traffic load exceeds the load threshold for the first modulator comprises comparing the load threshold to measured data traffic over a past time duration; and
the traffic load on the second modulator comprises a committed information rate for data traffic for the plurality of beams of the second modulator.

21. The method of claim 17, wherein the determining whether one or more modulation and coding groups of the beam of the plurality of beams served by the first modulator may be reassigned to the second modulator of the plurality of modulators while maintaining a traffic load on the second modulator below the load threshold for the second modulator comprises:

determining that none of the modulation and coding groups of the beam of the plurality of beams served by the first modulator may be moved to the second modulator while maintaining a measured traffic load on the second modulator below the load threshold for the second modulator; and identifying that the one or more modulation and coding groups of the beam of the plurality of beams served by the first modulator may be reassigned to the second modulator while maintaining a committed information rate on the second modulator below the load threshold for the second modulator.

22. The method of claim 17, wherein the rebalancing comprises assigning a first modulation and coding group of the beam of the plurality of beams served by the first modulator to the second modulator, while a second modulation and coding group of the beam of the plurality of beams served by the first modulator remains assigned to the first modulator.

23. A system for modulator balancing in a multi-beam satellite communications network, comprising:

means for monitoring a traffic load on a first modulator of a plurality of modulators on a satellite, the modulator serving a plurality of beams;

means for determining that the traffic load exceeds a load threshold for the first modulator; and means for determining, responsive to the determination that the traffic load exceeds the load threshold, whether one or more modulation and coding groups of a beam of the plurality of beams served by the first modulator may be moved to a second modulator of the plurality of modulators while maintaining a traffic load on the second modulator below a load threshold for the second modulator; and means for rebalancing beam assignments for at least a subset of the plurality of modulators, wherein the rebalancing comprises assigning the one or more modulation and coding groups of the beam of the plurality of beams served by the first modulator to the second modulator.

24. The system of claim 23, wherein the means for rebalancing assigns a first modulation and coding group of the beam of the plurality of beams served by the first modulator to the second modulator, while a second modulation and coding group of the beam of the plurality of beams served by the first modulator remains assigned to the first modulator.

* * * * *